United States Patent
Ng et al.

(10) Patent No.: US 10,250,072 B2
(45) Date of Patent: Apr. 2, 2019

(54) WIRELESS POWER TRANSFER SYSTEM

(71) Applicant: Versitech Limited, Hong Kong (HK)

(72) Inventors: Wai Man Ng, Hong Kong (HK); Cheng Zhang, Kowloon (HK); Deyan Lin, Kowloon (HK); Ron Shu Yeun Hui, Shatin New Territories (HK)

(73) Assignee: The University of Hong Kong, Hong Kong (HK)

( * ) Notice: Subject to any disclaimer, the term of this patent is extended or adjusted under 35 U.S.C. 154(b) by 374 days.

(21) Appl. No.: 13/975,409

(22) Filed: Aug. 26, 2013

(65) Prior Publication Data

US 2015/0054344 A1    Feb. 26, 2015

(51) Int. Cl.

| H01F 27/42 | (2006.01) |
|---|---|
| H01F 38/00 | (2006.01) |
| H01F 37/00 | (2006.01) |
| H02J 50/12 | (2016.01) |
| H02J 5/00 | (2016.01) |
| H02J 7/02 | (2016.01) |
| H02J 17/00 | (2006.01) |
| H02J 50/40 | (2016.01) |

(52) U.S. Cl.
CPC .............. *H02J 50/12* (2016.02); *H02J 5/005* (2013.01); *H02J 7/025* (2013.01); *H02J 17/00* (2013.01); *H02J 50/40* (2016.02)

(58) Field of Classification Search
CPC .. H02J 5/005; H02J 17/00; H02J 7/025; H02J 3/383; H02J 7/0042; H02J 7/0044; H02J 13/0082; H02J 1/00; H02J 1/102; H02J 2001/106; H02J 2009/007; H02J 3/01; H02J 7/0004; H02J 7/0008; H02J 7/00

USPC ......................................................... 307/104
See application file for complete search history.

(56) References Cited

U.S. PATENT DOCUMENTS

| 3,832,530 A | 8/1974 | Reitboeck et al. |
|---|---|---|
| 5,258,766 A | 11/1993 | Murdoch |
| 9,087,638 B2 * | 7/2015 | Oettinger ................ H01F 38/14 |
| 9,125,259 B1 * | 9/2015 | Xiong ................ H05B 33/0815 |
| 2003/0062794 A1 | 4/2003 | Scheible et al. |

(Continued)

FOREIGN PATENT DOCUMENTS

| CN | 102983636 A | 3/2013 |
|---|---|---|
| JP | 2004159456 A | 6/2004 |

(Continued)

OTHER PUBLICATIONS

D, Wang, Y. Zhu, T.T. Mo, Q. Huang, "Enabling multi-angle wireless power transmission via magnetic resonance coupling," ICCCT 2012, pp. 1395-1400.

(Continued)

*Primary Examiner* — Jared Fureman
*Assistant Examiner* — Esayas Yeshaw

(57) ABSTRACT

The present invention provides a wireless power transmitter comprising at least two loops, and separate drivers, each driving a respective one of the loops and providing a respective alternating current to the respective loop, thereby to transmit wireless power for receipt by at least one wireless power receiver. Also provided is a wireless power receiver comprising a receiver loop, and at least two focusing loops. An associated system and an associated method are also provided.

19 Claims, 22 Drawing Sheets

(56) References Cited

U.S. PATENT DOCUMENTS

| | | | | |
|---|---|---|---|---|
| 2007/0057851 | A1* | 3/2007 | Leizerovich | H01Q 1/44 343/702 |
| 2008/0298100 | A1 | 12/2008 | Esaka | |
| 2009/0096143 | A1* | 4/2009 | Wampler, II | B23Q 3/069 269/10 |
| 2010/0033021 | A1 | 2/2010 | Bennett | |
| 2010/0034238 | A1* | 2/2010 | Bennett | H02J 5/005 375/130 |
| 2010/0081379 | A1* | 4/2010 | Cooper | H01Q 1/248 455/41.1 |
| 2010/0109445 | A1* | 5/2010 | Kurs | B60L 11/007 307/104 |
| 2011/0156493 | A1 | 2/2011 | Bennett | |
| 2011/0074218 | A1* | 3/2011 | Karalis | B60L 11/182 307/104 |
| 2011/0115303 | A1* | 5/2011 | Baarman | H02J 17/00 307/104 |
| 2011/0133568 | A1* | 6/2011 | Wang | H02J 17/00 307/104 |
| 2012/0169139 | A1 | 7/2012 | Kudo | |
| 2013/0175874 | A1* | 7/2013 | Lou | H04B 5/0093 307/104 |
| 2013/0300205 | A1* | 11/2013 | Tzanidis | H04B 5/0037 307/104 |
| 2014/0349573 | A1* | 11/2014 | Moes | H04B 5/0037 455/41.1 |
| 2014/0354220 | A1* | 12/2014 | Liu | H02J 50/10 320/108 |
| 2015/0022147 | A1* | 1/2015 | Jung | H02J 5/005 320/108 |

FOREIGN PATENT DOCUMENTS

| | | |
|---|---|---|
| JP | 2008283789 A | 11/2008 |
| JP | 2008283791 A | 11/2008 |

OTHER PUBLICATIONS

O. Jonah, S.V. Georgakopoulos, M.M. Tentzeris, "Orientation Insensitive power transfer by magnetic resonance for mobile devices," IEEE Wireless Power Transfer, Perugi, Italy, May 15-16, 2013, pp. 5-8.

* cited by examiner (a)

(b)

WIRELESS POWER TRANSFER SYSTEM

FIELD OF THE INVENTION

The present invention relates to wireless power transfer systems, and wireless power transmitters and wireless power receivers that form parts of such systems.

BACKGROUND OF THE INVENTION

Wireless power was proposed a century ago by Nicolas Tesla. FIG. 1 depicts one of Tesla's experiments showing a 2-resonator system. However, for the first half of the 20th century, no serious application was found because of the relatively poor energy efficiency of 2-coil systems as transmission distances increased. In the 1960's, wireless power transfer research regained interest in medical implant applications (see References 1 to 4 listed below). Recently, 4-coil systems (see References 5 and 6 listed below), as shown in FIG. 2, and domino systems with relay resonators (see References 7 to 10 listed below), as shown in FIG. 3, have been proposed.

It has been pointed out in a recent critical review (see Reference 11 listed below) of wireless power transfer that non-radiative wireless power transfer technologies can be classified as one of two approaches. The first approach is the maximum energy efficiency (MEE) method and the second approach is the maximum power transfer (MPT) method.

The MEE method is based on the near-field magnetic coupling of the coils or coil-resonators and does not require any impedance matching between the driving source and the driven system. This approach does not have the restriction of limiting the overall system energy efficiency to be not higher than 50%. References 9 and 10 listed below fall under this category. This MEE approach has been the common practice in the design of transformers and switched mode power supplies. This approach is suitable for operating frequencies not higher than several mega-hertz and is very suitable for short-range wireless power transfer.

The MPT method, on the other hand, requires the impedance matching of the driving source and the system impedance. It is also called the magnetic resonance method. References 5 to 7 listed below fall under this category. This approach suffers an inherent limitation in that the overall system energy efficiency can never exceed 50%, which is a feature of the maximum power transfer theorem. However, an extended wireless power transmission distance can be achieved, at the expense of energy efficiency. This approach has been used in high-frequency communication circuits and antenna designs. Impedance matching is a key characteristic in this approach.

Up until the present time, the majority of the non-radiative wireless power systems have the power flow either in one direction (i.e. 1-dimensional power flow) or two directions on the same plane (i.e. 2-dimensional power flow). However, two recent reports explore the possibility of omni-directional wireless power (i.e. 3-dimensional power flow). The authors of Reference 12 listed below suggest the use of orthogonal coils to reduce the effect of small mutual inductance when the receiver coil is perpendicular to one of the transmitter coils. They consider the open-ended coils as antennas, and use the parasitic coil inductance and capacitance to form an equivalent LC circuit. Since they consider the coils as antennas, their design approach (based on MPT) suffers the following limitations:

1. The length of the wire used to implement the resonant circuit is comparable to the wavelength at the resonant frequency. Both the transmitter and receiver coils are one quarter of the wavelength at the resonant frequency. This approach is therefore dimension dependent and is restrictive in terms of the relative sizes of the transmitter and receiver coils.
2. Due to the usually low parasitic capacitance in open-ended coils, the resonant frequency and therefore the operating frequency is usually high. High-frequency AC power sources are usually more expensive than low-frequency AC power sources.

The authors of Reference 12 listed below drove the two separate orthogonal coils with the same AC current (i.e. the two separate coils are connected in series).

This is why they could demonstrate that the receiver coil can pick up maximum power at an angle of 45° between the two orthogonal transmitter coils. This result is reasonable because at 45°, the vectorial sum of the two co-axial magnetic field vectors from the two orthogonal coils is at a maximum if the two coil currents are identical. They also suggested extending the concept to a 3-dimensional structure based on 3 separate orthogonal coils that are connected in series and fed by the same current.

In Reference 13 listed below, a 3-coil receiver structure with 3 orthogonal open-ended coils was placed inside a similar but larger 3-coil transmitter structure also with open-ended coils (see FIG. 5). Again, the 3 orthogonal transmitter coils were connected in series and driven with the same AC current. It was demonstrated that wireless power transfer to the 3-coil receiver unit can be achieved regardless of the orientation of the receiver unit inside the transmitter structure. However, this orientation-insensitive feature is only possible if the receiver has 3 orthogonal coils. For RFID tag applications, it is more likely to have a single planar coil in the RFID tag as a receiver coil. Therefore, the approach in Reference 13 is not suitable for a single-coil receiver.

In summary, the magnetic resonance techniques used in both References 12 and 13 listed below are based on impedance matching and adopt the MPT method. According to Reference 11 listed below, the system energy efficiency will never exceed 50%. The use of the same current in the orthogonal coils also does not generate magnetic field vectors that point in all directions in a 3-dimensional (3D) manner, which is an essential feature for true omni-directional wireless power transfer.

It is an object of the present invention to overcome or ameliorate at least one of the disadvantages of the prior art, or to provide a useful alternative.

SUMMARY OF THE INVENTION

A first aspect of the present invention provides a wireless power transmitter comprising:
at least two loops;
separate drivers, each driving a respective one of the loops and providing a respective alternating current to the respective loop, thereby to transmit wireless power for receipt by at least one wireless power receiver; and
a controller for coordinated current control of the drivers such that a magnetic field vector is generated by the respective alternating currents and is controllable to point in one or more of any direction in two-dimensional or three-dimensional space thereby transmitting wireless power in one or more predetermined directions in two-dimensional or three-dimensional space.

In one embodiment, the respective alternating currents provided by the drivers differ in one or more of phase angle, frequency, and amplitude. In one embodiment, the wireless power transmitter comprises a capacitor connected in series with each loop.

In one embodiment, the wireless power transmitter is powered by an AC power source.

In another embodiment, the wireless power transmitter is powered by a DC power source providing DC power, and each driver comprises a power inverter to convert the DC power into AC power. In one embodiment, the wireless power transmitter is powered by a DC power source providing DC power, and each driver comprises an inverter leg of a power inverter to convert the DC power into AC power.

In one embodiment, the wireless power transmitter comprises a power control switching controller to coordinate the drivers.

In one embodiment, the respective alternating currents provided by the drivers are high frequency alternating currents.

In one embodiment, the wireless power transmitter comprises three of the loops.

In one embodiment, each loop defines a respective loop plane, the loops being arranged such that the loop planes are orthogonal to each other.

In one embodiment, the drivers drive the loops to transmit wireless power in one or more predetermined axial directions. In one embodiment, the drivers only drive a subset of the loops.

In one embodiment, two loops are driven to transmit wireless power in all directions in one plane. In another embodiment, three loops are driven to transmit wireless power in all directions in three-dimensional space.

In one embodiment, the loops define an interior space for receiving one or more wireless power receivers such that wireless power can be transmitted from the wireless power transmitter for receipt by the wireless power receivers. In another embodiment, the loops surround a receptacle for receiving one or more wireless power receivers such that wireless power can be transmitted from the wireless power transmitter for receipt by the wireless power receivers.

In various embodiments, each loop is any one of circular, triangular, rectangular, and polygonal in cross-section.

A second aspect of the present invention provides a wireless power receiver comprising:

a receiver loop wound around a receiver loop axis and defining a receiver loop plane, the receiver loop plane having a receiving side for receiving wireless power;

at least two focusing loops, each focusing loop defining a respective focusing loop plane, the focusing loops arranged on the receiving side adjacent the loop axis and uniformly around the loop axis with the focusing loop planes tilted towards the receiver loop plane.

In one embodiment, the focusing loop planes are tilted towards the receiver loop plane such that each focusing loop plane forms an angle from 45° to 60° with the receiver loop axis.

In one embodiment, the receiver loop is connected to a load, thereby allowing wireless power received by the wireless power receiver to be delivered to the load.

A third aspect of the present invention provides a wireless power transfer system comprising:

a wireless power transmitter comprising:
at least two loops; and
separate drivers, each driving a respective one of the loops and providing a respective alternating current to the respective loop, thereby to transmit wireless power; and one or more wireless power receivers for receiving wireless power transmitted by the wireless power transmitter.

In one embodiment, one or more wireless power receivers comprises:

a receiver loop wound around a receiver loop axis and defining a receiver loop plane, the receiver loop plane having a receiving side for receiving wireless power;

at least two focusing loops, each focusing loop defining a respective focusing loop plane, the focusing loops arranged on the receiving side adjacent the loop axis and uniformly around the loop axis with the focusing loop planes tilted towards the receiver loop plane.

In one embodiment, one or more wireless power receivers comprises one loop.

In one embodiment, one or more wireless power receivers comprises two or three loops. In one embodiment, each loop defines a respective loop plane, the loops being arranged such that the loop planes are orthogonal to each other.

In one embodiment, one or more wireless power receivers comprises more than three loops.

In one embodiment, one or more wireless power receivers has a loop connected to a load, thereby allowing wireless power received by the wireless power receiver to be delivered to the load.

A fourth aspect of the present invention provides a method of transmitting power wirelessly, the method comprising:

providing at least two loops;

supplying a separate alternating current to each loop, thereby to transmit wireless power for receipt by at least one wireless power receiver.

In one embodiment, the separate alternating currents differ in one or more of phase angle, frequency, and amplitude.

In one embodiment, each loop is provided with a series connected capacitance.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1:
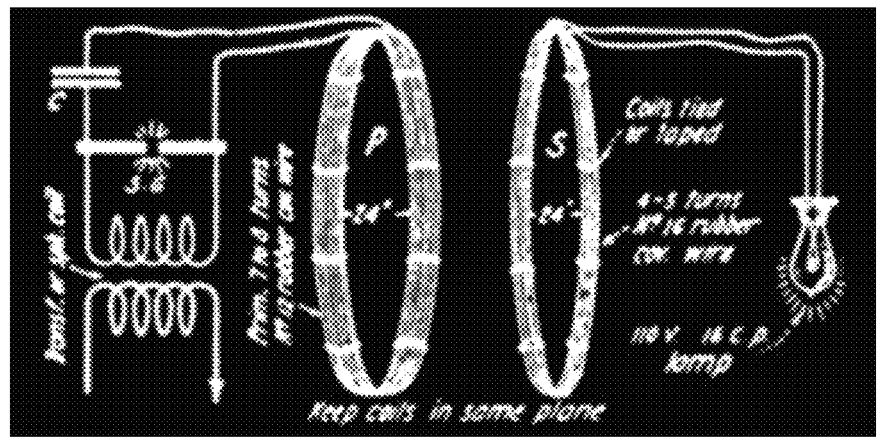
FIG. 1 is a schematic diagram of a prior art wireless power transfer system.
Figure 2:
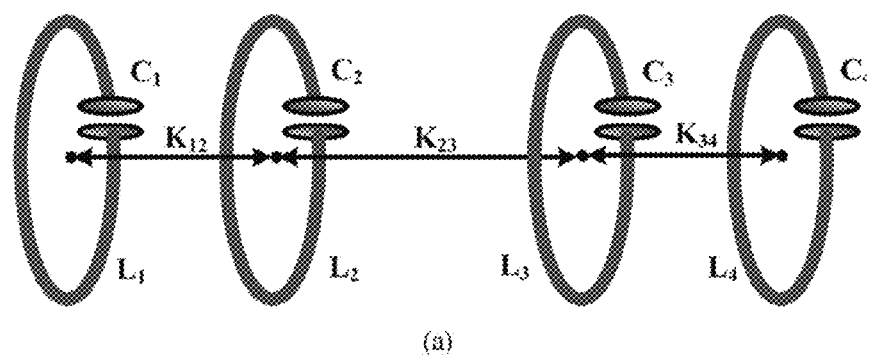
FIGS. 2(a) and (b) are schematic diagrams of a prior art 4-coil wireless power transfer system.
Figure 2:
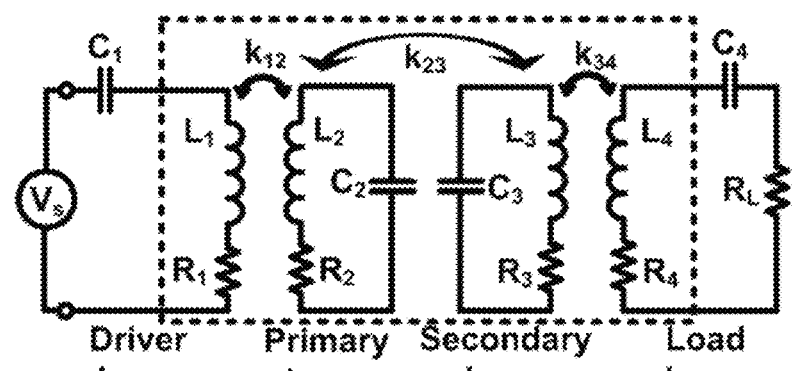
Figure 3:
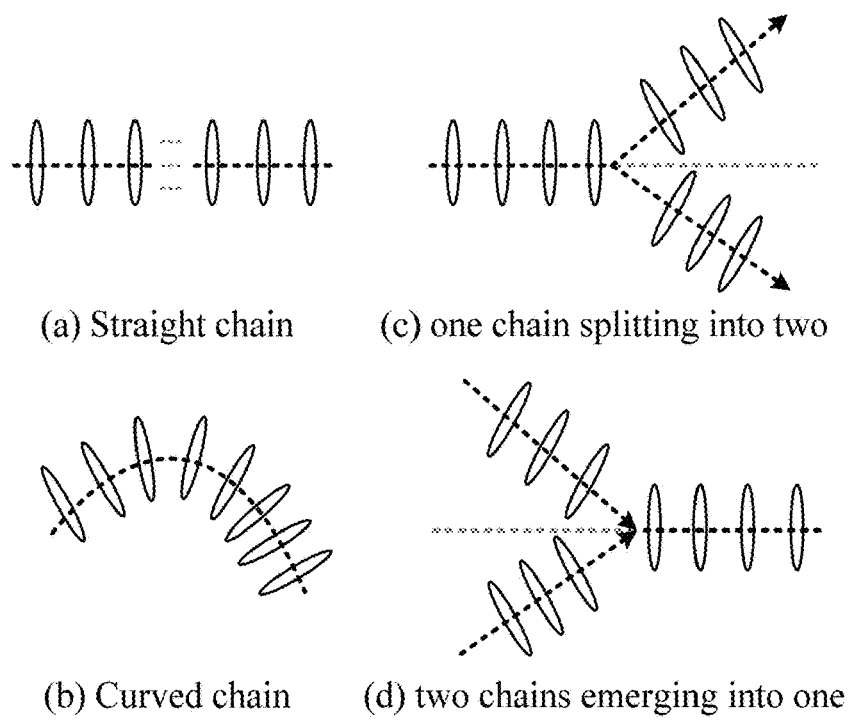
FIGS. 3(a) to (d) are schematic diagrams of a prior art domino-resonator wireless power transfer system.
Figure 4:
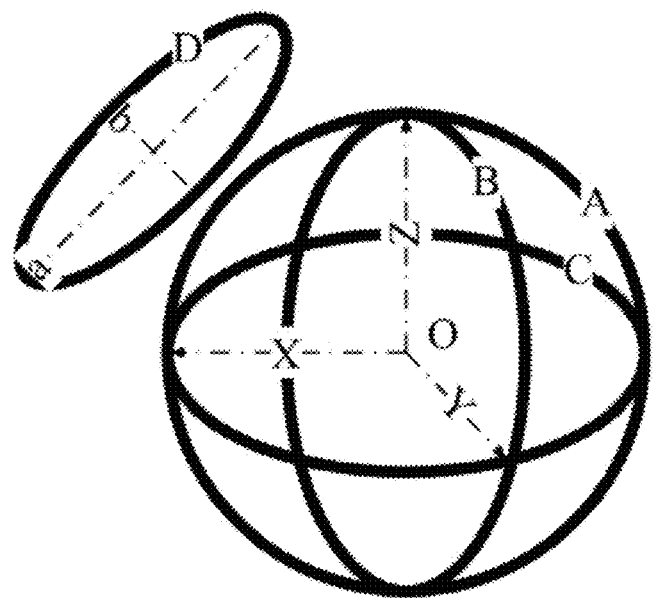
FIG. 4 is a schematic diagram of a prior art wireless power transfer system using 3 orthogonal coils connected in series as a wireless power transmitter, as described in Reference 12 listed below.
Figure 5:
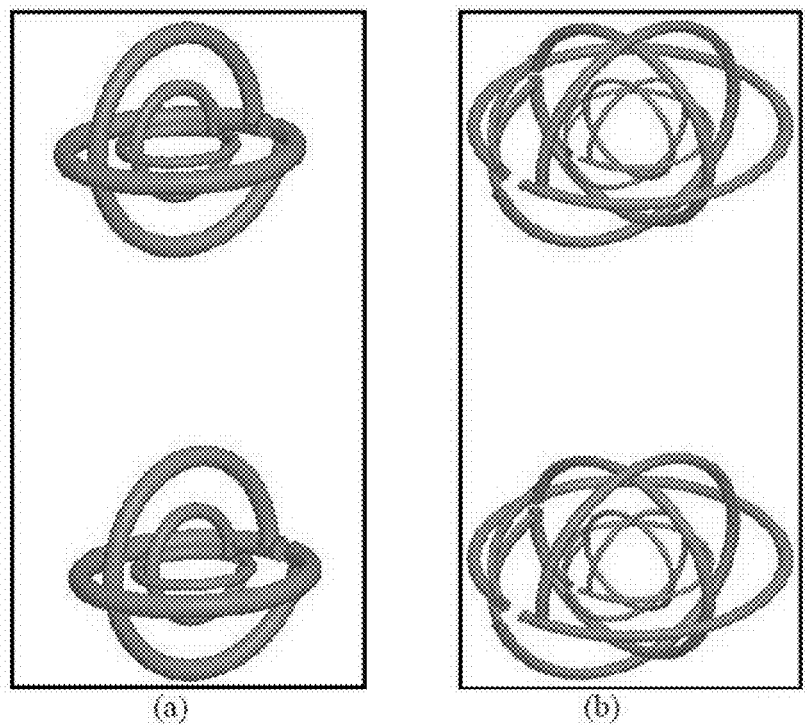
FIG. 5(a) is a schematic diagram of a prior art wireless power transfer system showing a 2-coil receiver inside a 2-coil transmitter, as described in Reference 13 listed below.
FIG. 5(b) is a schematic diagram of a prior art wireless power transfer system showing a 3-coil receiver inside a 3-coil transmitter, as described in Reference 13 listed below.

Referring to the figures, an embodiment of the present invention provides a wireless power transmitter 1 comprising at least two loops 2 and 3. The wireless power transmitter also comprises separate drivers 4 and 5, each driving a respective one of the loops 2 and 3 and providing a respective alternating current 6 and 7 to the respective loop, thereby to transmit wireless power for receipt by at least one wireless power receiver 8.

In one embodiment, the wireless power transmitter comprises three loops, that is, a third loop 9 in addition to the two loops 2 and 3. There is also therefore a third driver 10, in addition to the two drivers 4 and 5. The third driver 10 drives the third loop 9 and provides a third alternating current 11 to the third loop 9. This is in addition to the first driver 4 driving the first loop 2 and providing the first alternating current 6 to the first loop 2, and the second driver 5 driving the second loop 3 and providing the second alternating current 7 to the second loop 3.

Each loop defines a respective loop plane, the loops being arranged such that the loop planes are orthogonal to each other. The loops can be any one of circular, triangular, rectangular, and polygonal in cross-section. The loops are typically arranged concentrically. Therefore, if the loops are circular in cross-section, then the loops will form part of or approximate part of a surface of a sphere.

In other embodiments, the loop planes are not necessarily orthogonal to each other. In yet other embodiments, there are more than three loops.

Throughout this specification, the terms "loop", "coil", "winding", "resonator", "loop coil", "loop resonator", "coil resonator", and the like, are equivalent terms and can be used interchangeably. The terms all refer to a conductive structure capable of magneto-inductive coupling with another such conductive structure. Typically, this is in the form of a conductive wire wound in one or more loops around an axis.

The respective alternating currents 6, 7, and 11 provided by the drivers 4, 5, and 10 can differ in one or more of phase angle, frequency, and amplitude. A power control switching controller coordinates the drivers 4, 5, and 10 in order to control the differences in one or more of phase angle, frequency, and amplitude between the respective alternating currents 6, 7, and 11. This includes controlling the drivers such that the respective alternating currents are identical, that is, there are no differences in phase angle, frequency, or amplitude, as well as generating differences in one or more of phase angle, frequency, or amplitude. In one embodiment, the drivers are controlled to generate periodically rotating a magnetic field vector with a trajectory that forms a spherical surface.

Thus, the wireless power transmitted by the wireless power transmitter 1 can be controlled over a broad range of axial directions. In one embodiment, the drivers drive the loops to transmit wireless power in one predetermined axial direction. In other embodiments, the drivers drive the loops to transmit wireless power in more than one predetermined axial direction. In another embodiment, the wireless power transmitter 1 comprises two loops 2 and 3, and the two loops are driven to transmit wireless power in all directions in one plane. In a further embodiment, the wireless power transmitter 1 comprises three loops 2, 3, and 9, and the three loops are driven to transmit wireless power in all directions in three-dimensional space. In this way, the wireless power transmitter 1 can be described as "omni-directional" in that the wireless power transmitter 1 can transmit wireless power "omni-directionally".

In other embodiments, the drivers only drive a subset of the loops. For example, in the wireless power transmitter 1 with three loops 2, 3, and 9, all three loops can be driven to transmit wireless power in all directions in three-dimensional space. However, the drivers can drive or excite only two of the loops 2 and 3, and the two loops are thereby driven to transmit wireless power in all directions in only one plane.

Figure 22:
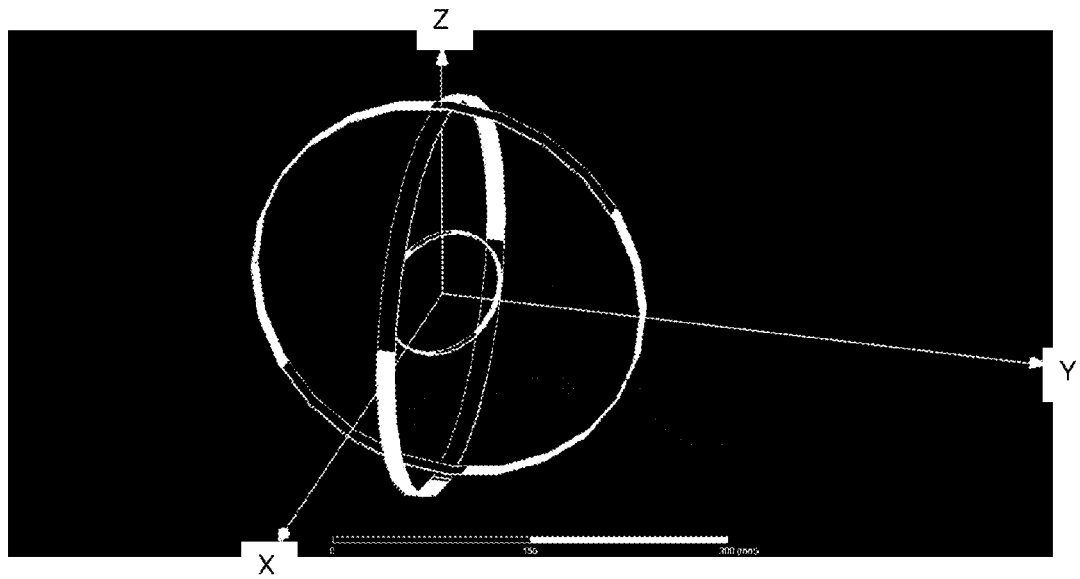
FIG. 22 is a schematic diagram of a wireless power transfer system in accordance with an embodiment of the present invention, showing a wireless power transmitter with two orthogonal coils, and a wireless power receiver with a single coil placed in an interior space defined by the coils of the wireless power transmitter.
Figure 23:
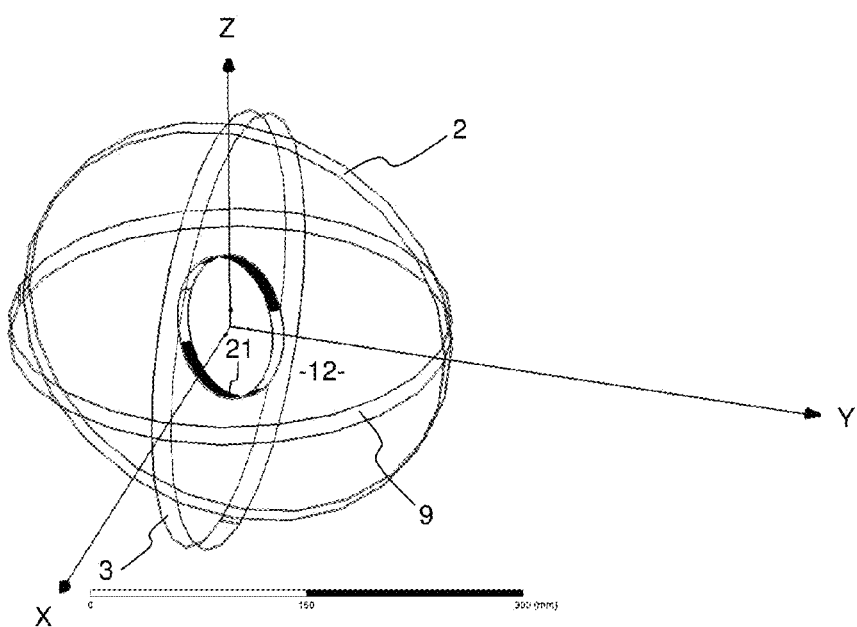
FIG. 23 is a schematic diagram of a wireless power transfer system in accordance with an embodiment of the present invention, showing a wireless power transmitter with three orthogonal coils, and a wireless power receiver with a single coil placed in an interior space defined by the coils of the wireless power transmitter.

In one embodiment, the loops define an interior space 12 for receiving one or more wireless power receivers 8 such that wireless power can be transmitted from the wireless power transmitter for receipt by the wireless power receivers. This is best shown in FIGS. 22 and 23. In another embodiment, the loops surround a receptacle for receiving one or more wireless power receivers 8 such that wireless power can be transmitted from the wireless power transmitter for receipt by the wireless power receivers. For example, the receptacle can be a container whereby the loops are wound around or embedded within the walls of the container. The container can receive wireless power receivers in the form of RFID tags having a single coil. In this way, the RFID tags can be powered or recharged by placing them inside the container.

Figure 7:
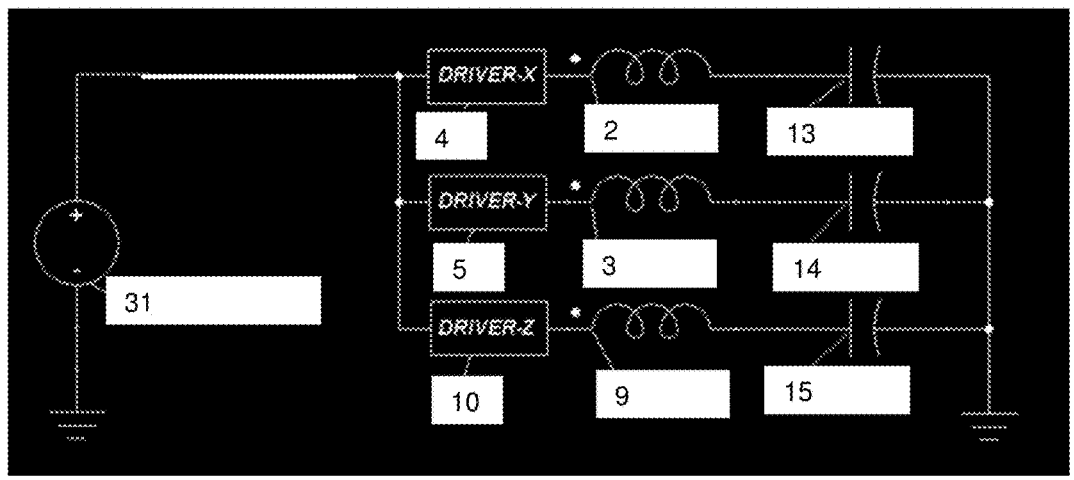
FIG. 7 is a schematic diagram of a driving circuit for driving three orthogonal coils in a wireless power transmitter in accordance with an embodiment of the present invention.

The wireless power transmitter 1 further comprises a capacitor connected in series with each loop. As shown in FIG. 7, each loop 2, 3, and 9, is connected to a respective capacitor 13, 14, and 15. Thus, each loop and the respective capacitor form an LC resonator that can optimize the power level and efficiency of wireless power transfer.

In one embodiment, the wireless power transmitter 1 is powered by an AC power source. In another embodiment, the wireless power transmitter 1 is powered by a DC power source providing DC power, and each driver comprises a power inverter to convert the DC power into AC power. In a further embodiment, the wireless power transmitter 1 is powered by a DC power source providing DC power, and each driver comprises an inverter leg of a power inverter to convert the DC power into AC power. Thus, the separate drivers 4, 5, and 10 can take the form of separate parts of a single physical driver, such as the separate inverter legs of a single power inverter unit. Alternatively, the separate drivers 4, 5, and 10 can take the form of separate physical drivers, such as separate power inverter units. The respective alternating currents 6, 7, and 11 provided by the drivers 4, 5, and 10 are high frequency alternating currents. Typically, the respective alternating currents are higher than 10 kHz.

An embodiment of another aspect of the present invention provides a wireless power receiver 16 comprising a receiver loop 17 wound around a receiver loop axis and defining a receiver loop plane, the receiver loop plane having a receiving side 18 for receiving wireless power. The wireless power receiver 16 further comprises at least two focusing loops 19, each focusing loop defining a respective focusing loop plane, the focusing loops arranged on the receiving side 18 adjacent the loop axis and uniformly around the loop axis with the focusing loop planes tilted towards the receiver loop plane. This embodiment with two focusing loops 19 can be referred to as a 2D wireless power receiver since it is particularly suited to receiving wireless power along a plane. In other embodiments, the wireless power receiver comprises three, four, or more such focusing loops 19.

As will be appreciated, the two or more focusing loops 19 form a funnel-like arrangement having an open end that funnels down towards a point at which the focusing loops are more closely adjacent each other. The receiver loop 17 is positioned inside the opening of the funnel-like arrangement, with the point at which the focusing loops are more closely adjacent each other directed towards a wireless power transmitter, such as the single loop wireless power transmitter 20 shown in FIG. 19.

In some embodiments, the focusing loop planes are tilted towards the receiver loop plane such that each focusing loop plane forms an angle from 45° to 60° with the receiver loop axis.

The receiver loop 17 can be connected to a load, thereby allowing wireless power received by the wireless power receiver to be delivered to the load. Throughout this specification, a wireless power receiver can either be or not be connected to a load. Where a wireless power receiver is not connected to a load, it is acting purely as a wireless power relay, relay receiver, or a relay resonator, that relays the wireless power it receives to a further wireless power receiver, which in turn, may or may not be connected to a load.

An embodiment of another aspect of the present invention provides a wireless power transfer system comprising the wireless power transmitter 1 described above. The wireless power transfer system further comprises one or more wireless power receivers for receiving wireless power transmitted by the wireless power transmitter.

Figure 14:
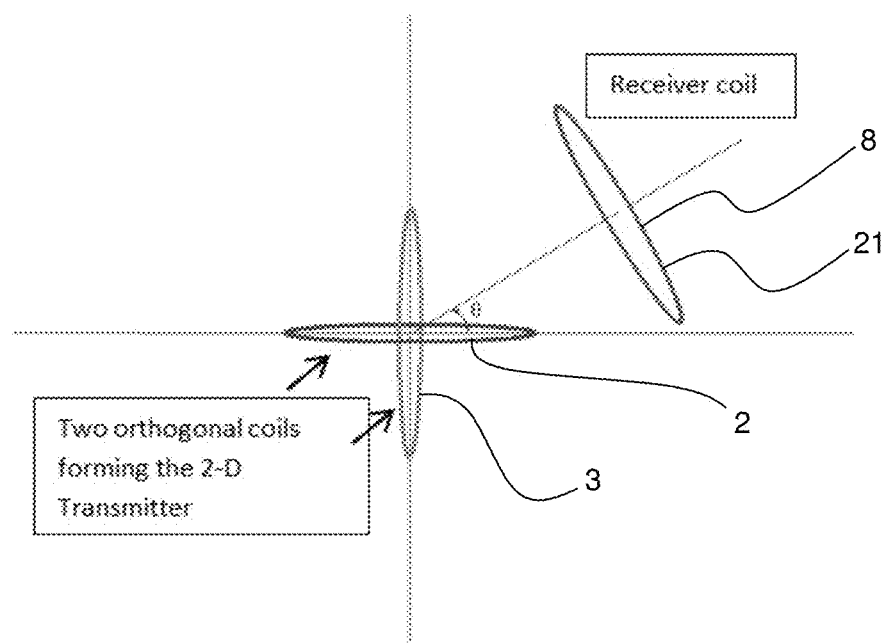
FIG. 14 is a schematic diagram of a wireless power transfer system in accordance with an embodiment of the present invention, showing a wireless power transmitter with two orthogonal coils and a wireless power receiver with a single coil from the point of view of looking down a vertical axis passing through the orthogonal coils of the wireless power transmitter.

In one embodiment, the one or more wireless power receivers comprises the wireless power receiver 16 described above. In another embodiment, the one or more wireless power receivers comprises one loop. FIG. 14 shows such a single loop wireless power receiver 21. FIGS. 22 and 23 show another example of a single loop wireless power receiver 21. In FIGS. 22 and 23, the single loop power receiver is located in the interior space 12 of the wireless power transmitter 1. The wireless power transmitter 1 in FIG. 22 has two orthogonal loops, whilst the wireless power transmitter 1 in FIG. 23 has three orthogonal loops. The wireless power receiver 21 can be in the form of an RFID tag.

In further embodiments, the one or more wireless power receivers comprises two or three loops. In some of these embodiments, each loop defines a respective loop plane, the loops being arranged such that the loop planes are orthogonal to each other. In other embodiments, the one or more wireless power receivers comprises more than three loops. In these embodiments, the loop planes of the loops need not necessarily be orthogonal to each other, that is, some or none may be orthogonal to each other.

Figure 20:
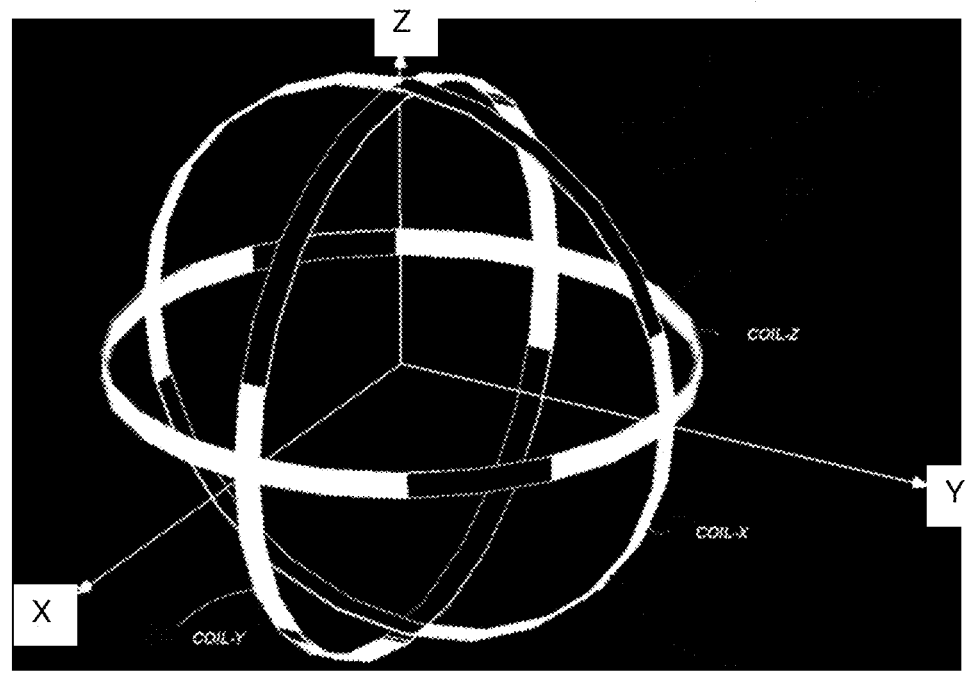
FIG. 20 is a schematic diagram of a wireless power receiver with three orthogonal coils in accordance with an embodiment of the present invention.
Figure 21:
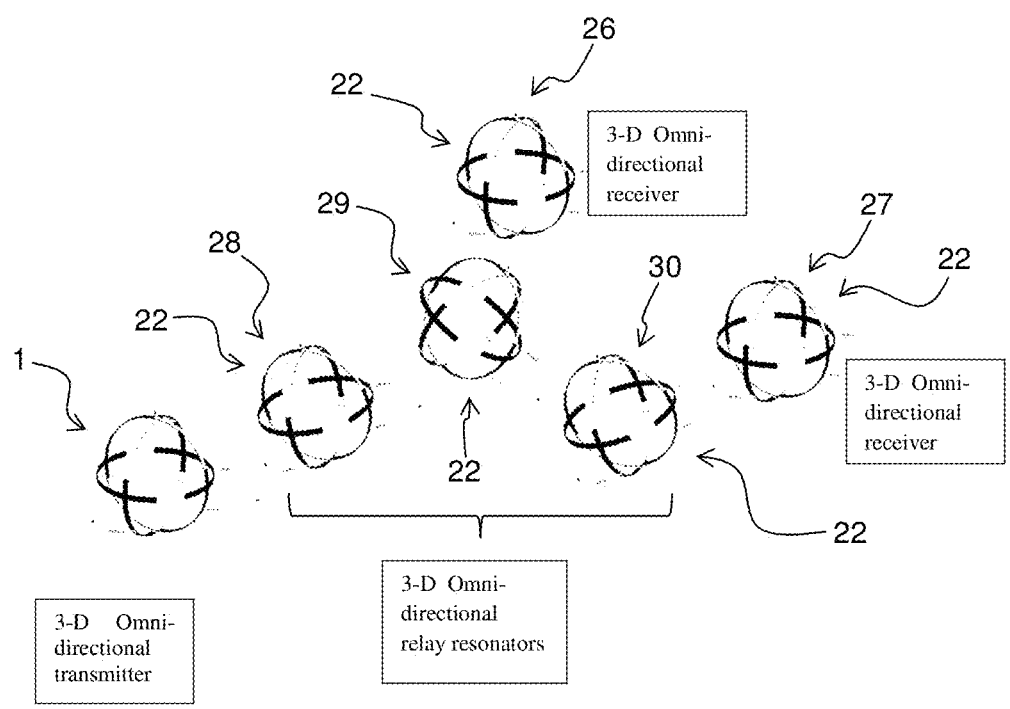
FIG. 21 is a schematic diagram of a wireless power transfer system in accordance with an embodiment of the present invention, showing a wireless power transmitter with three orthogonal coils, three wireless power receivers with three orthogonal coils and acting as relay resonators, and two wireless power receivers with three orthogonal coils.

FIG. 20 shows a wireless power receiver 22 having three orthogonal loops 23, 24, and 25. This wireless power receiver 22 can be referred to as a 3D wireless power receiver since it is particularly useful for receiving wireless power in all directions in 3-dimensional space. FIG. 21 shows a wireless power transfer system with five such three-loop wireless power receivers 22 and one three-loop wireless power transmitter 1.

The one or more wireless power receivers can have a loop connected to a load, thereby allowing wireless power received by the wireless power receiver to be delivered to the load. In FIG. 21, two wireless power receivers 26 and 27, out of the five three-loop wireless power receivers 22, have a loop connected to a load. The other three wireless power receivers 28, 29, and 30 act purely as relay receivers, or relay resonators. Thus, wireless power is generated by the wireless power transmitter 1, relayed by the wireless power receivers 28, 29, and 30 to the wireless power receivers 26 and 27, thereby powering the loads connected to the wireless power receivers 26 and 27.

An embodiment of another aspect of the present invention provides a method of transmitting power wirelessly, the method comprising providing at least two loops, such as the two loops 2 and 3 described above, and supplying a separate alternating current to each loop, such as the alternating currents 6 and 7 described above, thereby to transmit wireless power for receipt by at least one wireless power receiver.

Other embodiments comprise further steps which will be understood by those skilled in the art with reference to the present description.

The embodiments shown in the figures will now be described in more specific detail.

Figure 6:
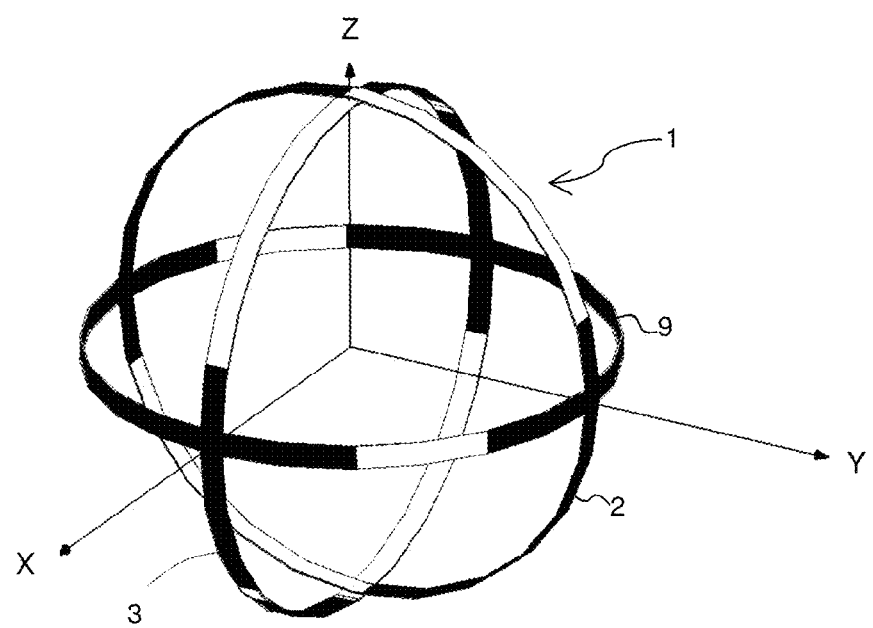
FIG. 6 is a schematic diagram of a wireless power transmitter in accordance with an embodiment of the present invention.

FIG. 6 shows the basic structure of the omni-directional wireless power transmitter 1 having three orthogonal loop coils 2, 3, and 9, which can also be referred to as Coil-X, Coil-Y, and Coil-Z, respectively, in accordance with an embodiment of the present invention. Embodiments of the present invention also provide new control methods for generating a magnetic field vector that can point in all directions or can be controlled in specific directions. The three coils are not necessarily circular in cross-section but can also have a triangular, rectangular, or any polygonal cross-section. The three coils are parallel to three planes that are orthogonal to each other respectively. Connected in this way, the mutual inductance of any pair of the orthogonal coils is very small and can be ignored (less than 1 percent of the self-inductances).

The three coils can be connected to an AC power source. An example of the power driving system is shown in FIG. 7, in which a DC power source 31 is turned into an AC power source through respective power inverters in each of the drivers 4, 5, and 10. These respective power inverters can be in the form of inverter legs of a DC to AC power inverter.

Preferably, the three coils 2, 3, and 9 are connected with series capacitors 13, 14, and 15, respectively, forming LC resonators that can optimize the power level and efficiency of wireless energy transfer. The transmitter 1 is driven by three independent drivers 4, 5, and 10 that are coordinated by a power control switching controller (not shown in FIG. 7). The three drivers 4, 5, and 10 drive the three coils 2, 3, and 9 with high frequency alternating currents.

The 3 coil currents can generally be expressed as:

$$I_1 = I_{m1} \sin(\omega t) \quad \text{(Equation 1)}$$

$$I_2 = I_{m2} \sin(\omega t + \alpha) \quad \text{(Equation 2)}$$

$$I_3 = I_{m3} \sin(\omega t + \beta) \quad \text{(Equation 3)}$$

where $\omega$ is the angular frequency of the currents, t is the time variable, $I_{mx}$ is the current magnitude of phase-x (for x=1, 2, 3); $\alpha$ and $\beta$ are two angular displacements.

Figure 8:
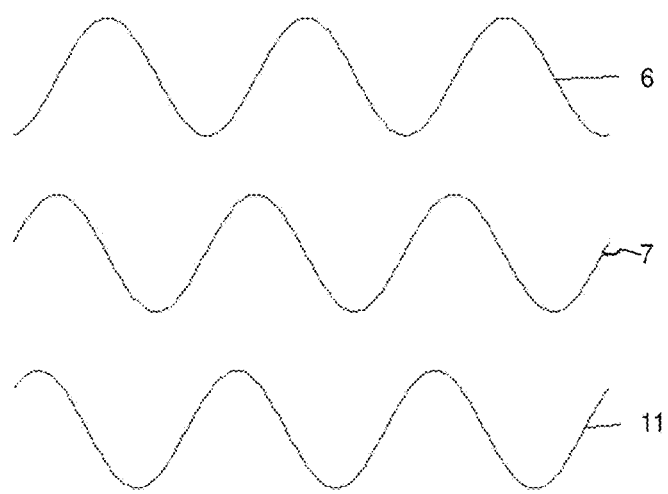
FIG. 8 is a graph showing current waveforms for three orthogonal coils under phase angle control in a wireless power transmitter in accordance with an embodiment of the present invention.
Figure 9:
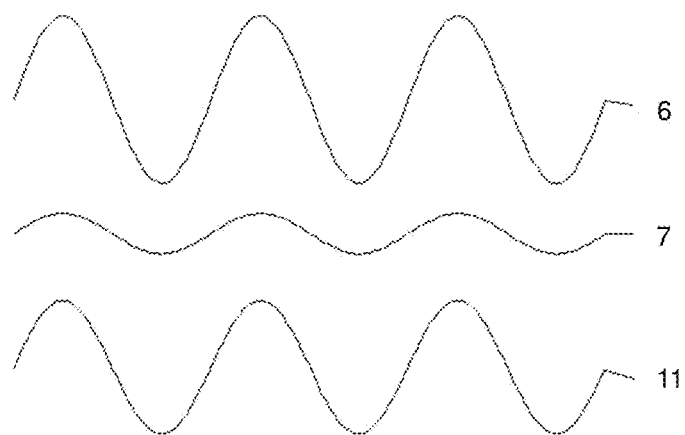
FIG. 9 is a graph showing current waveforms for three orthogonal coils under current magnitude control in a wireless power transmitter in accordance with an embodiment of the present invention.
Figure 10A:
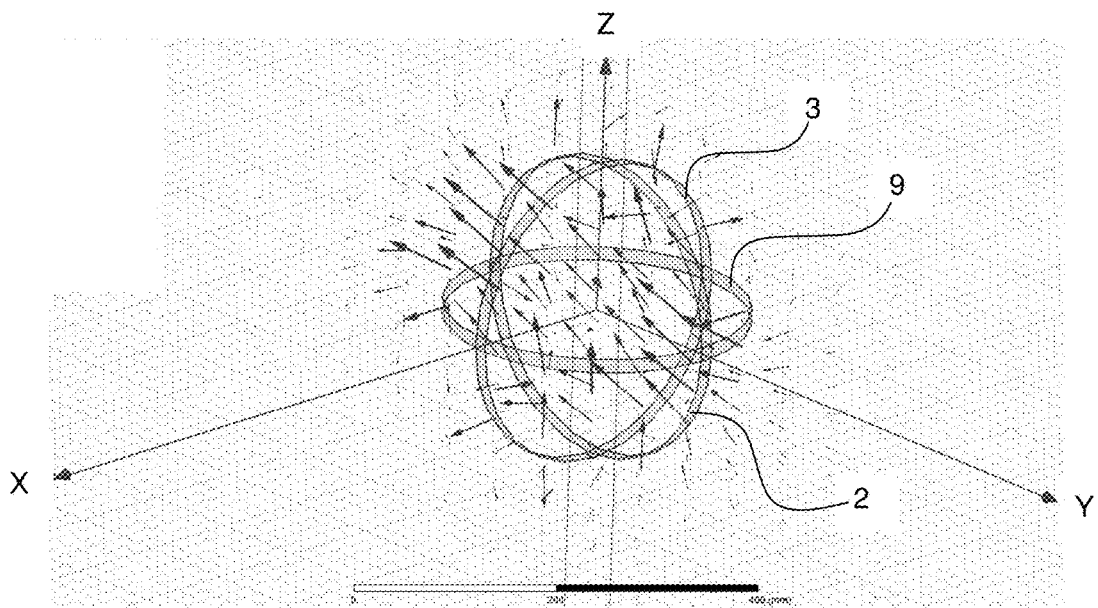
FIGS. 10(a) to (f) are graphs showing magnetic field vectors generated by a wireless power transmitter under phase angle control in accordance with an embodiment of the present invention.
Figure 10B:
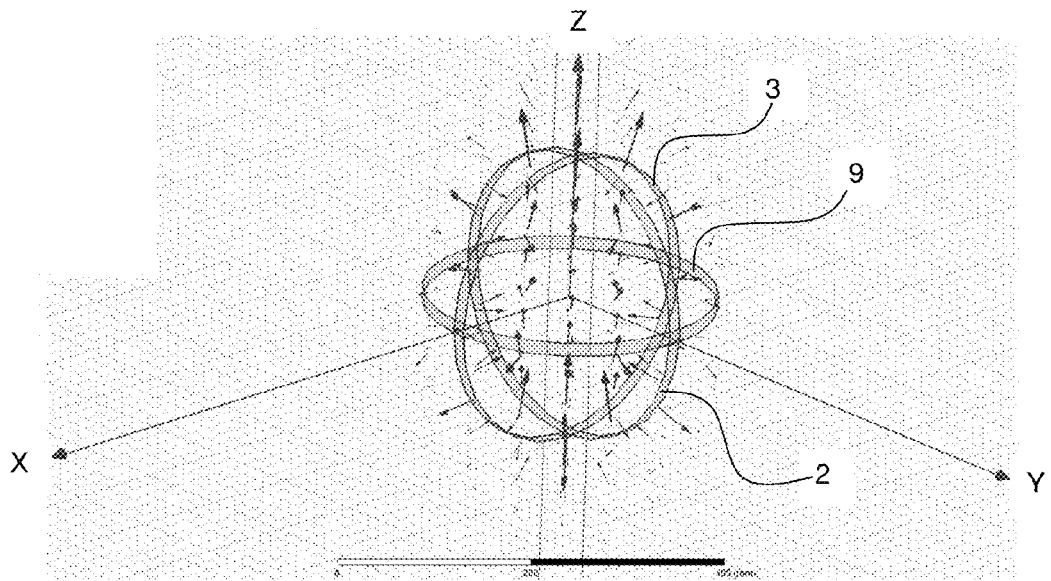
Figure 10C:
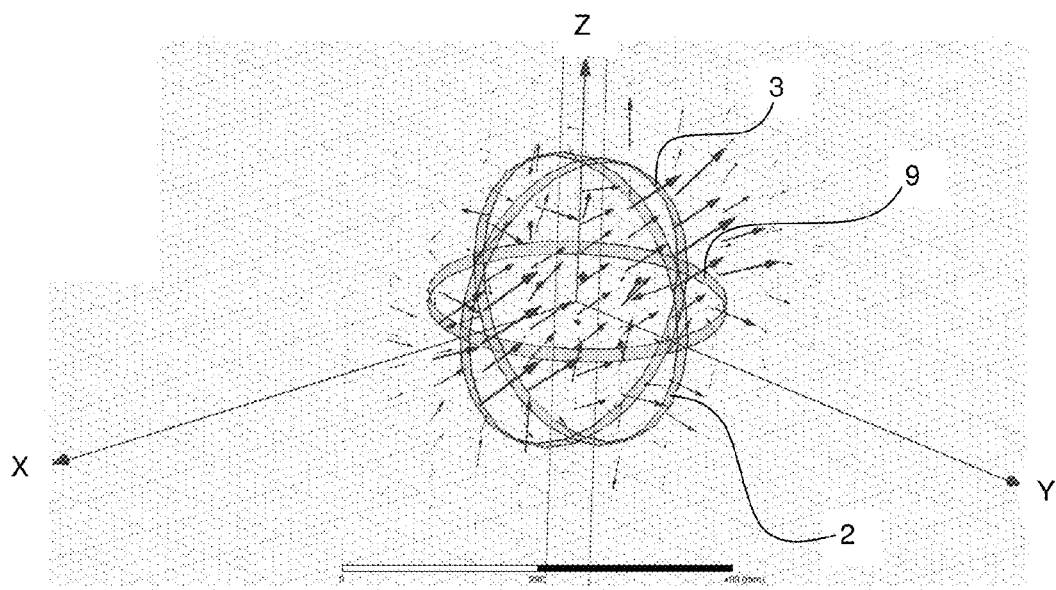
Figure 10D:
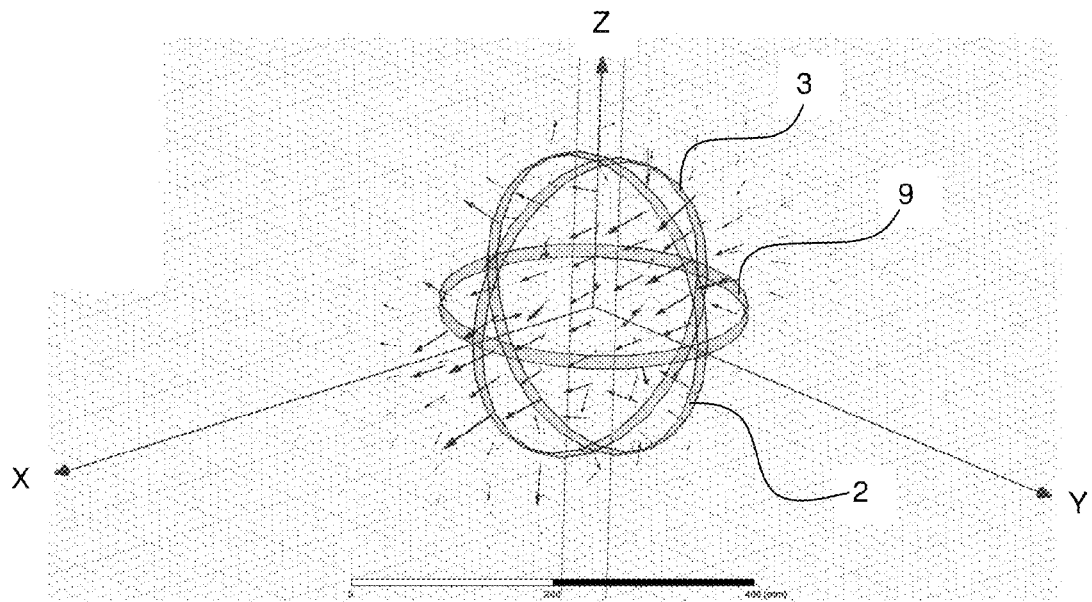
Figure 10E:
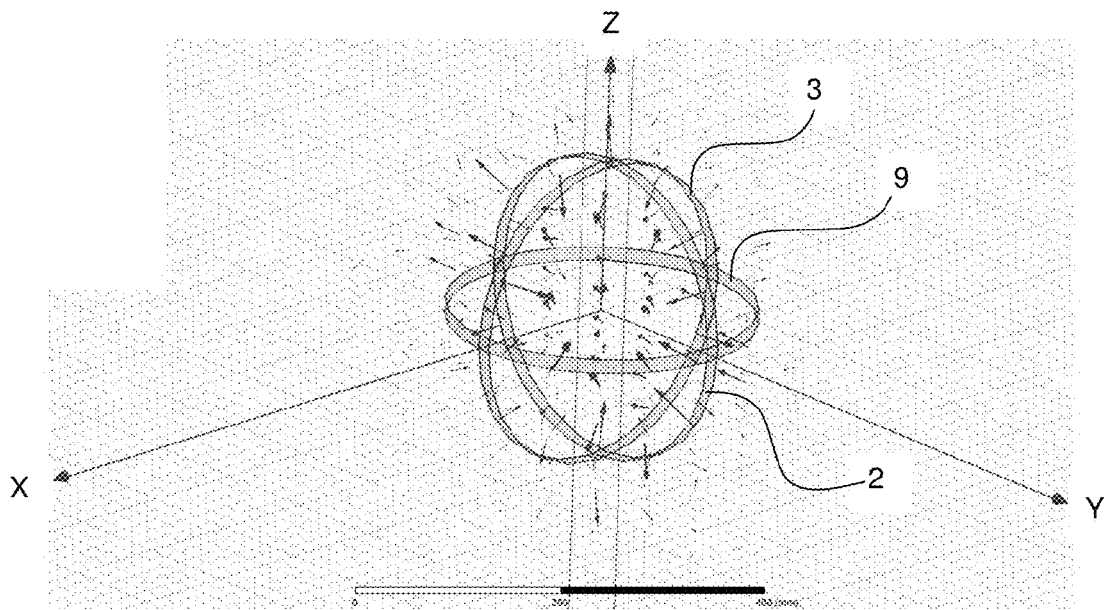
Figure 10F:
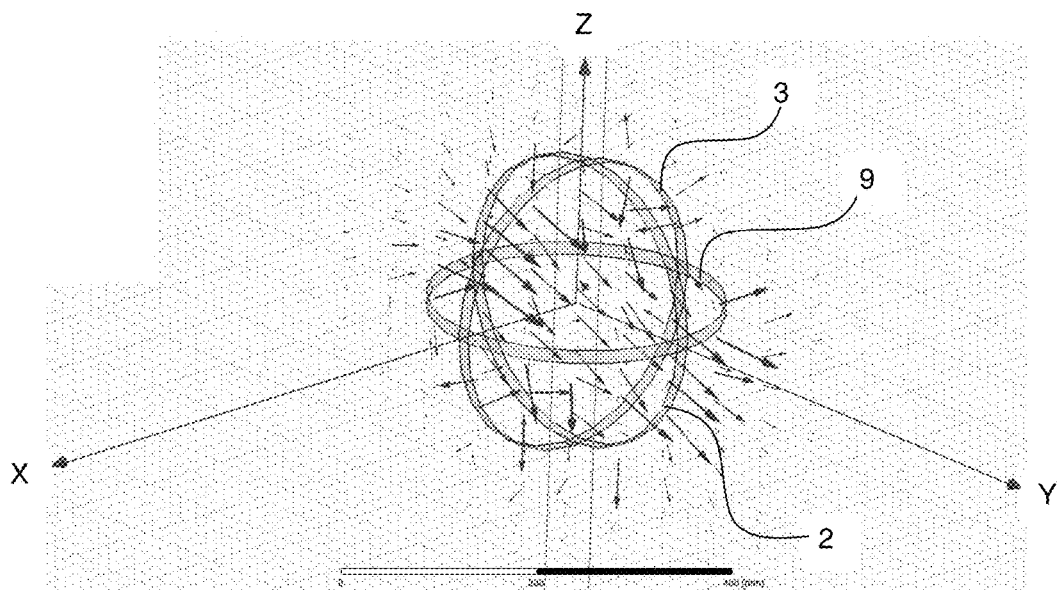

The omni-directional power transmitter 1 can be used to transmit energy towards an arbitrary direction. There are at least two control schemes:

1. The first control scheme is "Phase Angle Control or Frequency Modulation". There are phase angle differences between the coil currents 6, 7, and 11 of the three coils 2, 3, and 9. The typical control currents are shown in FIG. 8.
2. The second control scheme is "Current Magnitude Control or Amplitude Modulation" in which the current magnitudes of the coil currents 6, 7, and 11 are varied. Typical current waveforms are shown in FIG. 9.

In principle, it must be stressed that the first and the second control schemes can be used together if desired. In addition, one coil, two orthogonal coils, or three orthogonal coils can be excited if desired. In order to differentiate the differences between the proposed current control methods in this invention from the current method used in References 12 and 13 listed below, the methods of the present invention will be called "Co-ordinated Current Control" (CCC), and the method used in References 12 and 13 will be called "Identical Current Control" (ICC).

Phase Angle Control or Frequency Modulation

The Phase Angle Control and Frequency Modulation control scheme for the 3-dimensional omni-directional wireless power transmitter 1 has been studied with the aid of computer simulation software. For phase angle control, the three coil currents of Equations 1 to 3 have the same current magnitude (i.e. $I_{m1}=I_{m2}=I_{m3}$). One possible relationship of the two angular displacements is:

$$\alpha = k\beta \quad \text{(Equation 4)}$$

where k is a real number. In this case, this is a phase angle control.

For example, if $\alpha=2\pi/3$ (i.e. 120°) and k=2.0, then $\beta=4\pi/3$ (i.e. 240°). Equations 1 to 3 then become:

$$I_1 = I_{m1}\sin(\omega t) \quad \text{(Equation 5)}$$

$$I_2 = I_{m2}\sin\left(\omega t + \frac{2\pi}{3}\right) \quad \text{(Equation 6)}$$

$$I_3 = I_{m3}\sin\left(\omega t - \frac{2\pi}{3}\right) \quad \text{(Equation 7)}$$

Another possibility is to allow the phase angle to vary at a frequency. Equation 4 remains valid, but $$\alpha = |\alpha_m|\sin(\omega_2 t) \quad \text{(Equation 8)}$$

where $\omega_2$ is the angular frequency of the phase angle variation and $\alpha_m$ is the constant coefficient. In this case, the function of Equation 8 will make Equations 1 to 3 essentially under the control of frequency modulation.

Based on this principle, a time-domain computer simulation has been conducted. A few magnetic field vector plots have been sampled and displayed in FIG. 10(a) to FIG. 10(f). It can be seen that these vectors can be rotated and point to different directions periodically in a 3-dimensional manner. These plots (graphs) confirm the omni-directional capability of the wireless power transmitter 1. The receiver coils of the wireless power receivers 8 can be placed in any position around or inside the omni-directional transmitter 1 to pick up the wireless energy generated. By virtue of the controllability of the directions of the magnetic field vectors, the power flow can also be controlled into specific directions if desired.

Current Magnitude Control or Amplitude Modulation

For current magnitude control or amplitude modulation, Equations 1 to 3 still apply but the current magnitudes of $I_{m1}$, $I_{m2}$, and $I_{m3}$ are not necessary identical. In this case, the three coil currents 6, 7, and 11 are excited at the same frequency, but the current magnitudes may vary periodically in order to generate rotating magnetic field vectors in an omni-directional manner. This principle is now illustrated by an example, although the current magnitudes can also be varied by some other formats.

Let $$I_{m1} = I_m, \; I_{m2} = I_m\sin(\omega_2 t), \; I_{m3} = I_m\sin\left(\omega_2 t + \frac{\pi}{2}\right),$$

$$\alpha = \frac{\pi}{2} \text{ and } \beta = \frac{\pi}{2},$$

where $\omega_2$ is another angular frequency different from $\omega$.

Equations 1 to 3 become:

$$I_1 = I_m\sin(\omega t) \quad \text{(Equation 9)}$$

$$I_2 = [I_m\sin(\omega_2 t)]\sin\left(\omega t + \frac{\pi}{2}\right) \quad \text{(Equation 10)}$$

$$I_3 = \left[I_m\sin\left(\omega_2 t + \frac{\pi}{2}\right)\right]\sin\left(\omega t + \frac{\pi}{2}\right) \quad \text{(Equation 11)}$$

In this particular case, the magnitude of $I_1$ is constant. The magnitudes of $I_2$ and $I_3$ vary with two sinusoidal envelopes that are 90° out of phase.

Figure 11:
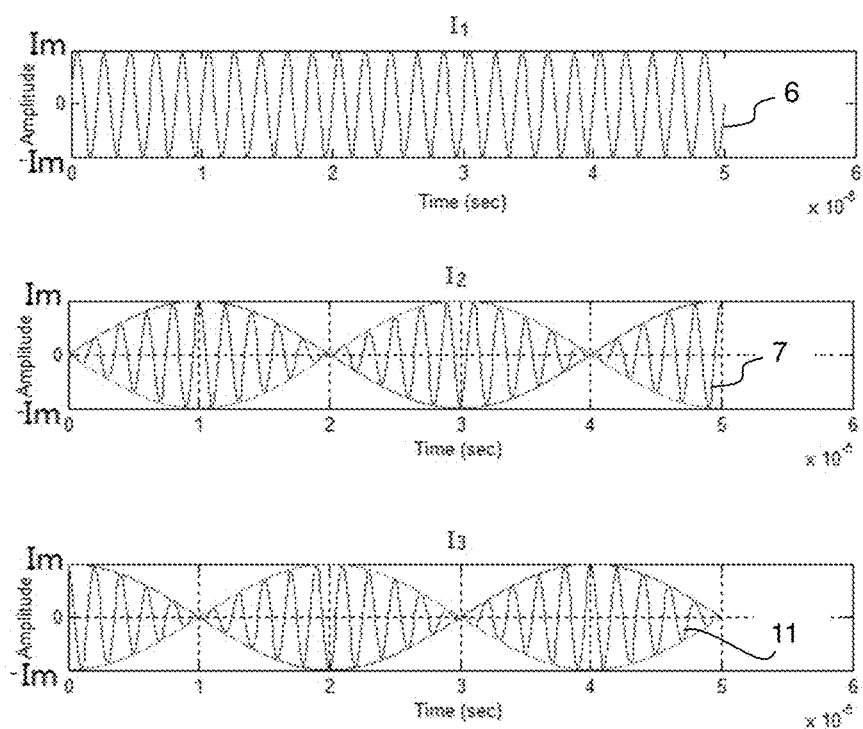
FIG. 11 is a graph showing current waveforms for three orthogonal coils under current amplitude modulation control in a wireless power transmitter in accordance with an embodiment of the present invention.
Figure 12A:
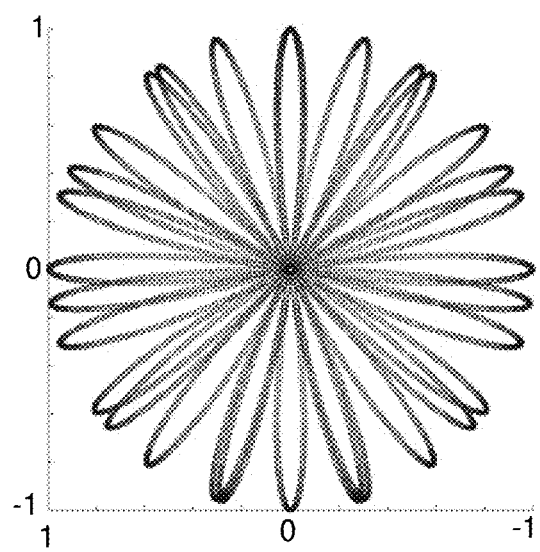
FIGS. 12(a) to (c) are graphs showing the trajectory of the peak magnetic field vector generated by a wireless power transmitter under current amplitude modulation control in accordance with an embodiment of the present invention.
Figure 12B:
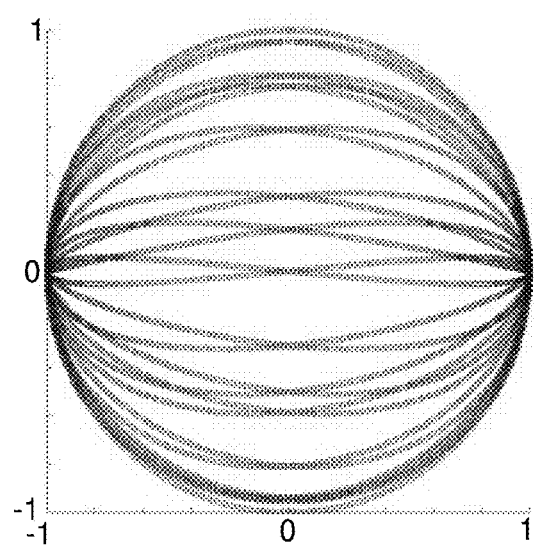
Figure 12C:
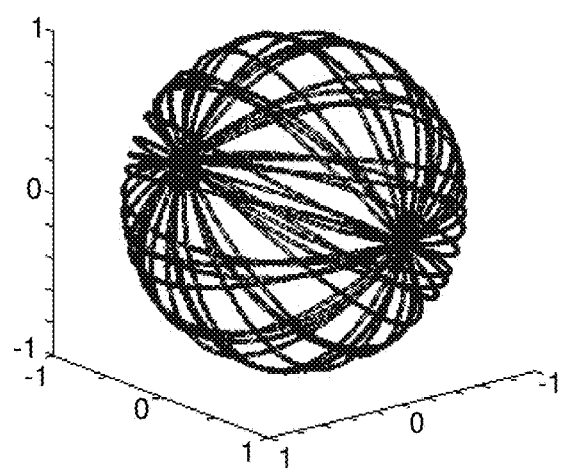

Based on the amplitude modulation control example described by Equations 9 to 11, the typical current waveforms are shown in FIG. 11. The arrowhead of the "peak" magnetic field vector moves with time. Its movement with time can be traced to form a trajectory. The trajectory of the magnetic field vector captured from different viewpoints is shown in FIG. 12(a) to FIG. 12(c). From these plots (graphs), it can be seen that the magnetic field vector rotates periodically in all directions, confirming the omni-directional nature of the wireless power transmitter 1. The formation of a sphere shape by the trajectory of the magnetic field vector is an indication of the omni-directional wireless power transfer capability of the 3D wireless power transmitter 1. It should be noted that the trajectory plotted in FIG. 12 is based on the peak magnetic field vector. The gaps between the lines are in fact filled with the trajectories of non-peak magnetic field vectors to form a slightly non-even spherical surface.

From Omni-Directional Control to Specific Directional Control

Figure 13A:
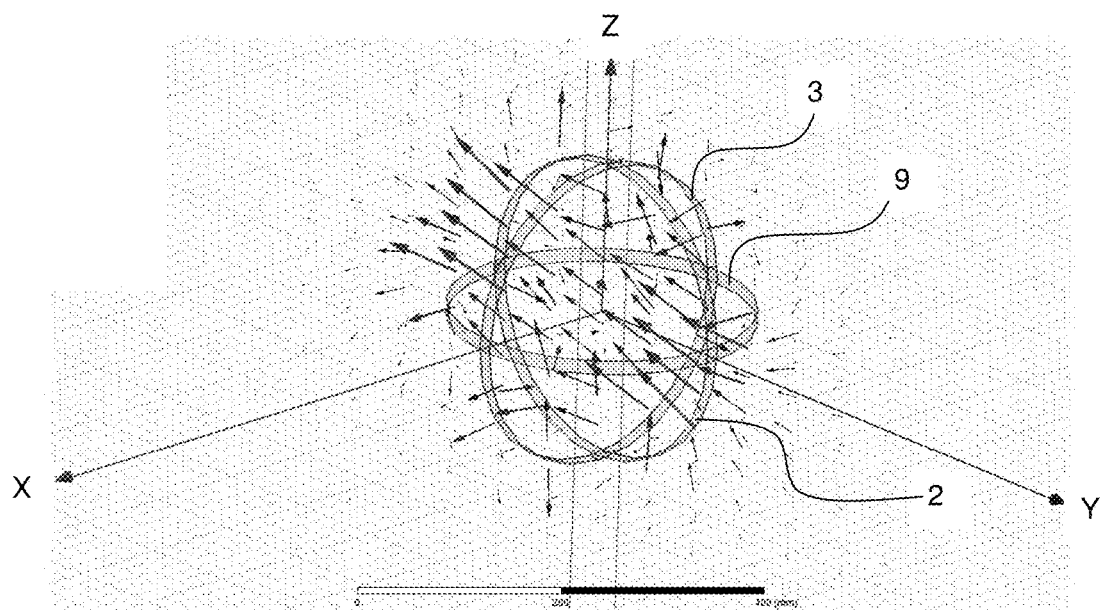
FIG. 13(a) is a graph showing magnetic field vectors generated by three orthogonal coils of a wireless power transmitter in accordance with an embodiment of the present invention, where the currents supplied to the three orthogonal coils are identical in magnitude and phase angle and are positive.
Figure 13B:
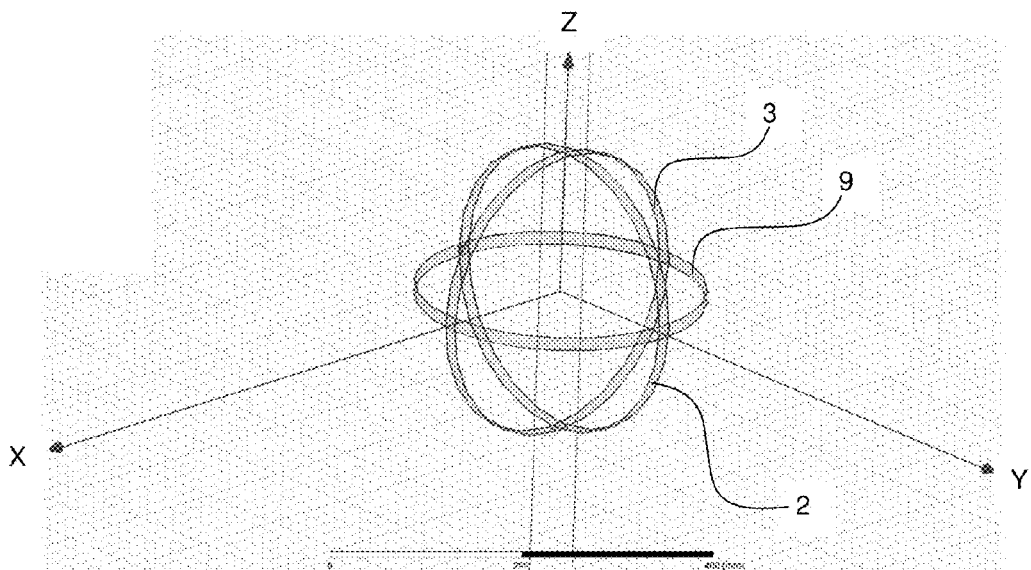
FIG. 13(b) is a graph showing magnetic field vectors generated by three orthogonal coils of a wireless power transmitter in accordance with an embodiment of the present invention, where the currents supplied to the three orthogonal coils are identical in magnitude and phase angle and are zero.
Figure 13C:
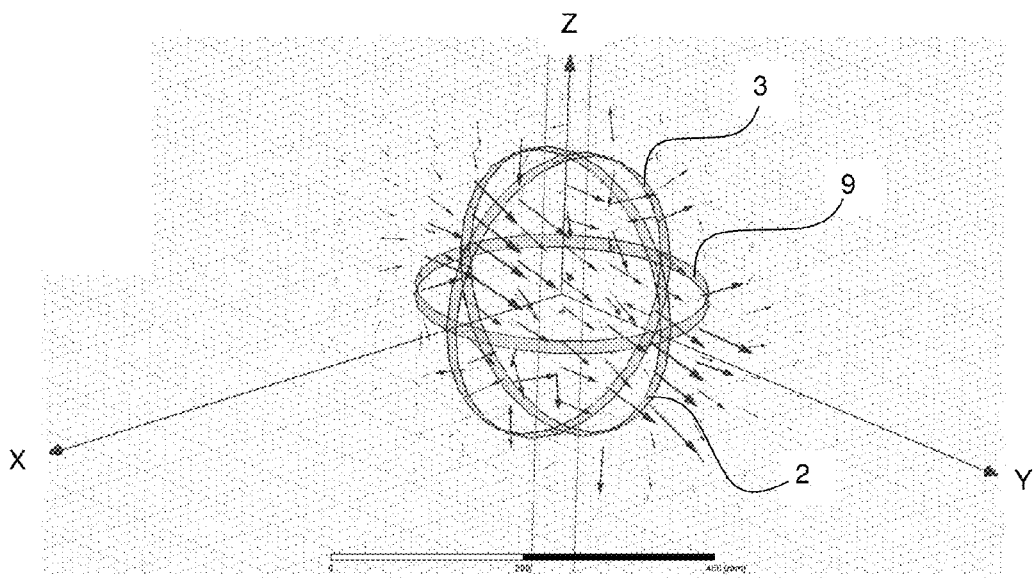
FIG. 13(c) is a graph showing magnetic field vectors generated by three orthogonal coils of a wireless power transmitter in accordance with an embodiment of the present invention, where the currents supplied to the three orthogonal coils are identical in magnitude and phase angle and are negative.

The omni-directional capability of the wireless power transmitter 1 also implies that the current magnitude and phase angle can be controlled in such a way that the magnetic field vectors can be controlled to point at any desired direction. That is to say, the wireless power transmitter 1 can transmit wireless power in one predetermined axial direction. This novel concept can be illustrated in the following example, in which the three coil currents 6, 7, and 11 are identical and are in phase. (These particular conditions are equivalent to the Identical Current Control (ICC) used in References 12 and 13. The difference being of course that in References 12 and 13, these conditions are fixed and permanent, whilst in the present invention, these particular conditions are selected from many possible conditions using the control methods of the present invention.) FIG. 13(a), FIG. 13(b), and FIG. 13(c) show the sampled magnetic field vector plots when the current is positive, zero and negative, respectively. It can be seen that the magnetic field vectors mainly point in two opposite directions along one line or axis, and do not point in all directions. These plots confirm the possibility of controlling the wireless power flow direction if necessary or desired. They also show that the Identical Current Control adopted in References 12 and 13 does not provide genuine omni-directional wireless power transfer since the power transfer cannot be controlled to vary from the one fixed and permanent direction. Thus, Identical Current Control is only one special case of current amplitude modulation control as provided by the present invention.

From 3D Omni-Directional Control to 2D Omni-Directional Control

Figure 15:
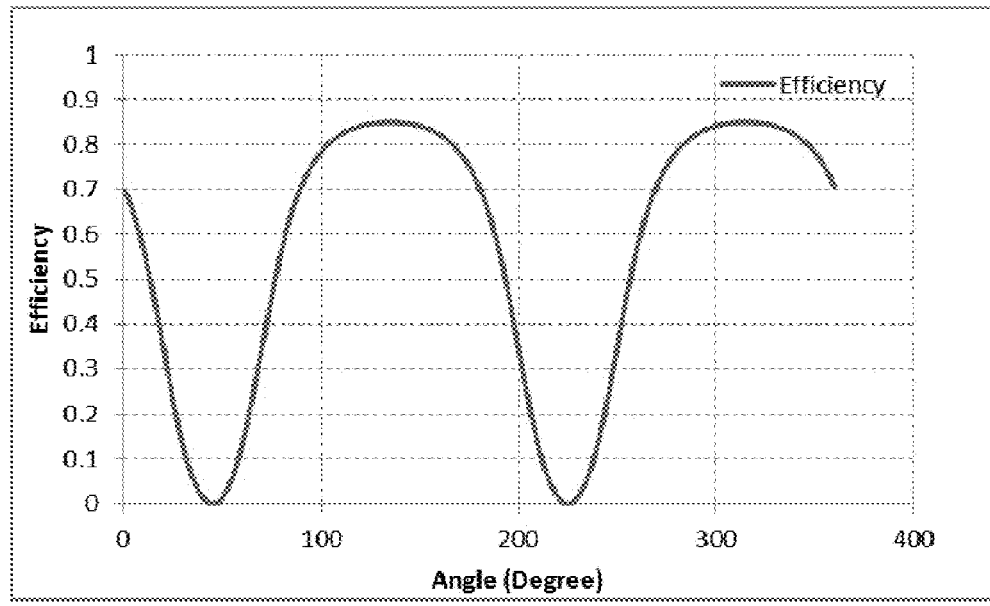
FIG. 15 is a graph showing the efficiency of the system shown in FIG. 14 at different angular positions around the vertical axis where the currents supplied to the two orthogonal coils of the wireless power transmitter have the same magnitude and the same phase angle.
Figure 16:
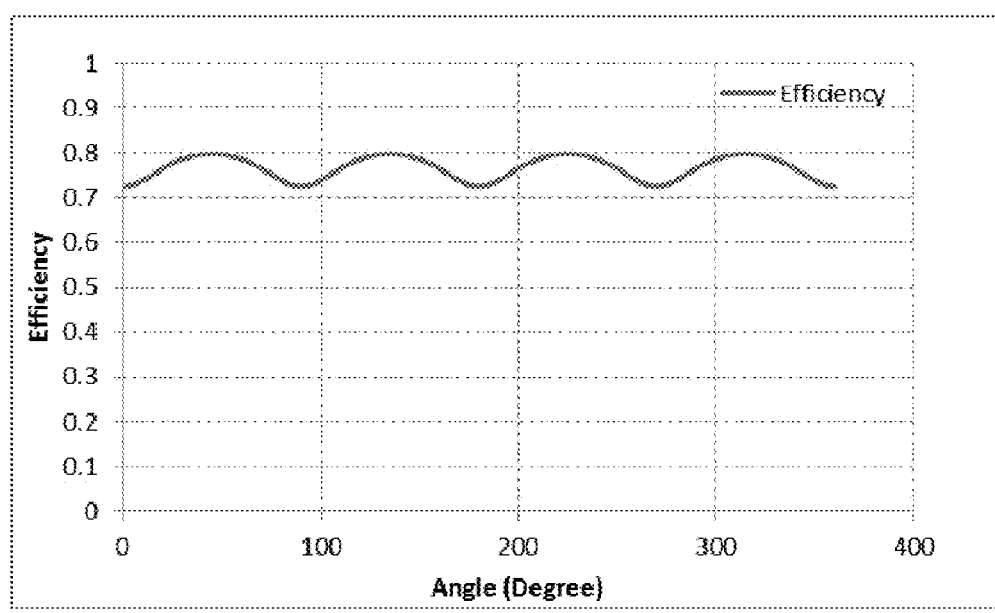
FIG. 16 is a graph showing the efficiency of the system shown in FIG. 14 at different angular positions around the vertical axis where the currents supplied to the two orthogonal coils of the wireless power transmitter have the same magnitude but have phase angles that are offset by 90°.
Figure 17:
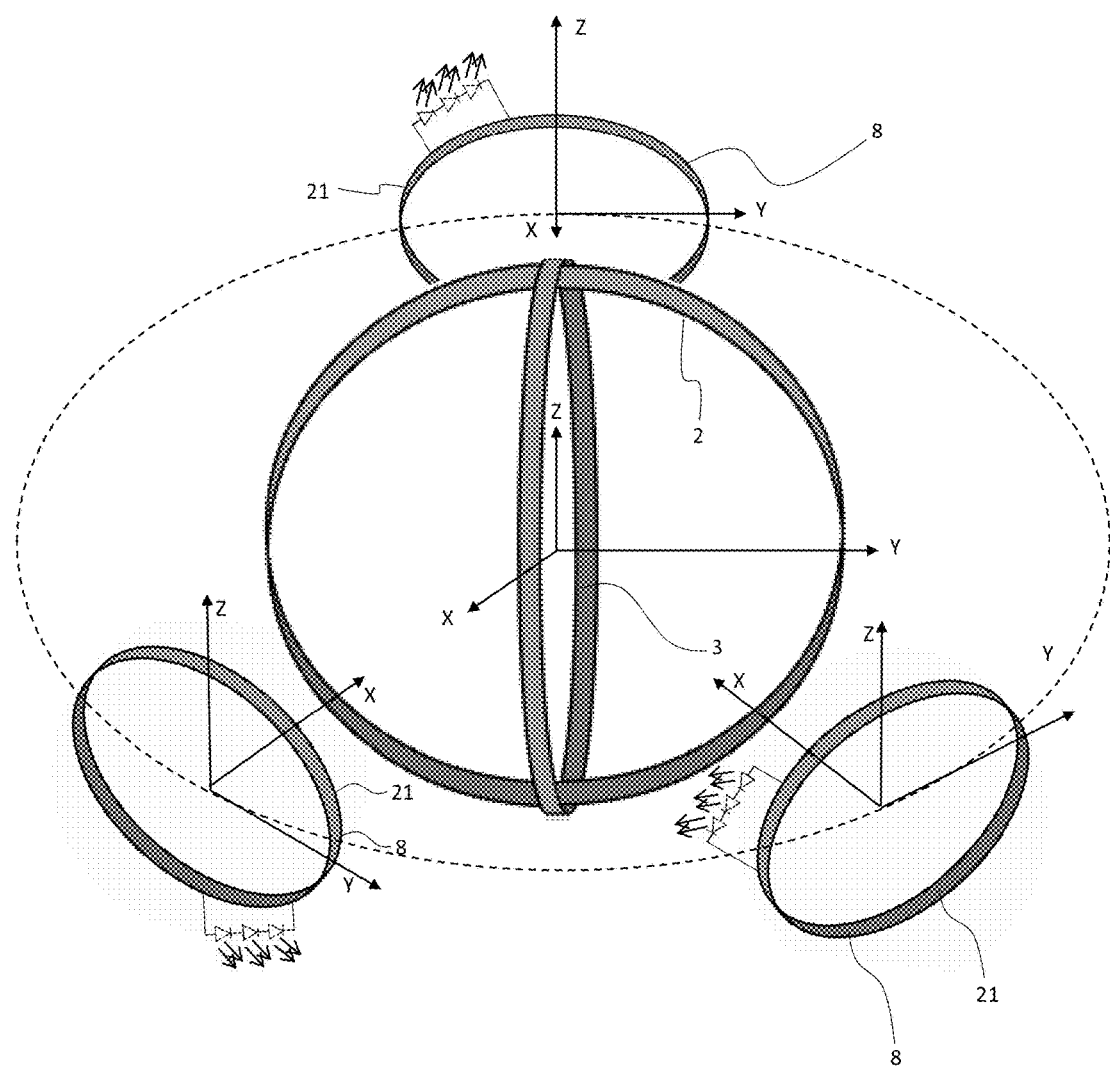
FIG. 17 is a schematic diagram showing three LED loads each being powered by a respective wireless power receiver with one resonator coil, with the respective wireless power receivers receiving wireless power from a 2D wireless power transmitter with two orthogonal coils receiving currents of the same magnitude but with phase angles that are offset by 90°, in accordance with an embodiment of the present invention.

The omni-directional wireless power flow concept of the present invention can be reduced to the 2-dimensional plane in some embodiments. Two orthogonal coils, such as coils 2 and 3, can form a 2D wireless power transmitter, such as the wireless power transmitter 1 shown in FIG. 14. If the two coils have the same current magnitude and the same phase angle, FIG. 15 shows a typical energy efficiency graph that would result. This control does not offer 2D omni-directional power transfer. However, if the two coils currents 6 and 7 have the same current magnitude and a 90° phase shift, the energy efficiency would improve significantly and become more uniform on the 2D plane, as shown in FIG. 16. FIG. 17 shows that 3 loads in the form of LEDs are powered by the wireless power receivers, or receiver resonators, to which they are connected, and which are placed around a 2D omni-directional wireless power transmitter 1. This 2D omni-directional wireless power transmitter shown in FIG. 17 has two coil currents 6 and 7 of the same magnitude and with a phase shift of 90°. This experiment confirms 2D omni-directional wireless power transmission by the wireless power transmitter 1 of FIG. 17.

3D and 2D Omni-Directional Wireless Power Receivers

With regard to wireless power receivers for use with 3D and 2D omni-directional wireless power transmitters 1, several options are available. One obvious option is to use the traditional single coil wireless power receiver or resonator as shown in FIG. 14 and FIG. 17. However, the present invention provides two new wireless power receiver structures.

Figure 18:
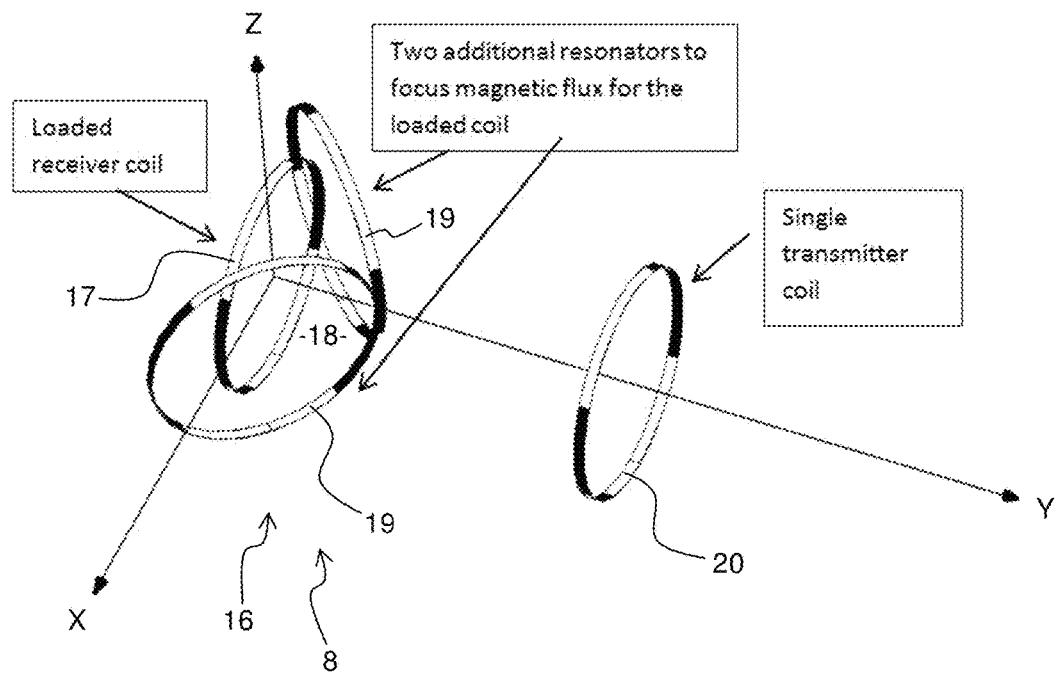
FIG. 18 is a schematic diagram of a wireless power transfer system in accordance with an embodiment of the present invention, showing a wireless power receiver with a receiver coil and two focusing coils, and a wireless power transmitter with a single coil.

Firstly, the 2D omni-directional wireless power receiver 16 uses two additional focusing loops 19, arranged in a V-shape or a funnel shape, to concentrate the magnetic field in the vicinity of the receiver loop 17, as shown in FIG. 18. The receiver loop 17 can be loaded, that is, connected to a load. The resonators (loops) can have a circular, square, rectangular or any polygonal cross-section. The acute angle of the two focusing loop planes of the additional focusing loops forming the V-shape can be of 90°, and preferably within the range of 60° to 120°. In other words, the focusing loop planes are preferably tilted towards the receiver loop plane such that each focusing loop plane forms an angle from 45° to 60° with the receiver loop axis.

Figure 19:
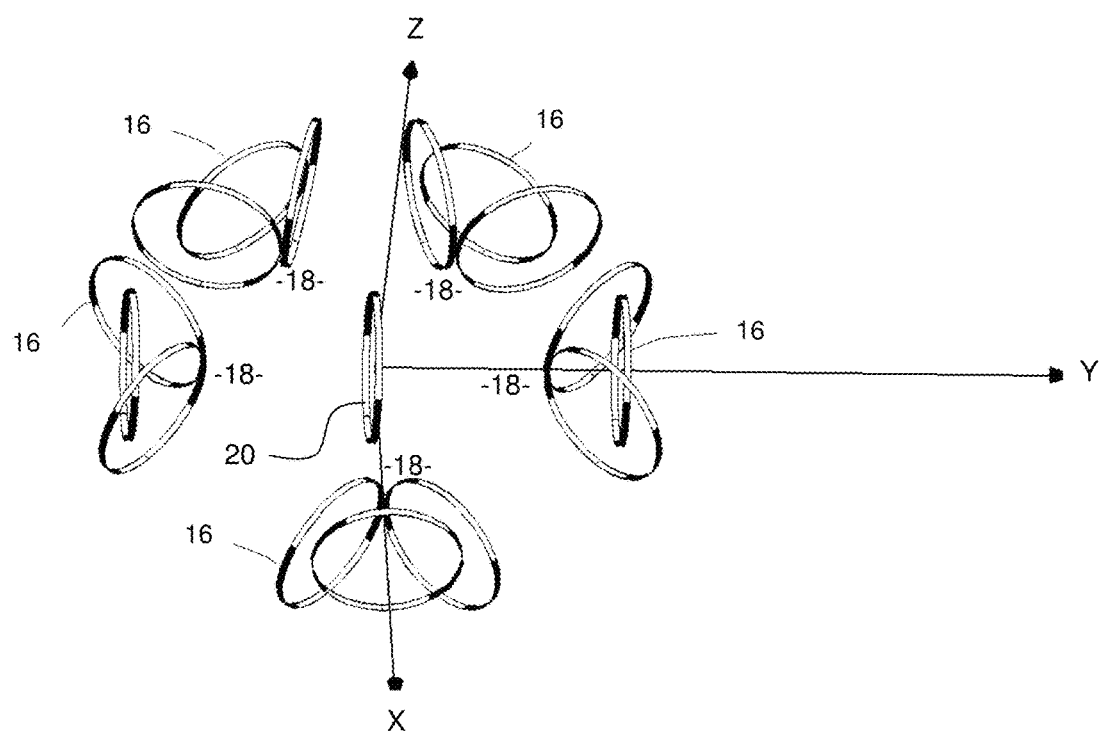
FIG. 19 is a schematic diagram of a wireless power transfer system in accordance with an embodiment of the present invention, showing five wireless power receivers, each with a receiver coil and two focusing coils, arranged in a plane around a wireless power transmitter with a single coil.

The loaded receiver loop 17 and the two additional focusing loops 19 form a 2D omni-directional wireless power receiver unit 16. An example of using such wireless power receiver units 16 with a single coil wireless power transmitter 20 is illustrated in FIG. 19.

The second wireless power receiver structure is the 3D omni-directional wireless power receiver 22. This wireless power receiver 22 has three orthogonal loops 23, 24, and 25, and has a structure similar to that of the wireless power transmitter 1 in FIG. 6. Again, the loops can have a circular, square, rectangular or any polygonal cross-section. The wireless power receiver 22 shown in FIG. 20 uses circular loops. One of the loops can be connected to a load to form a loaded loop.

3-D Omni-Directional Wireless Power Relay Receivers

If the 3D wireless power receiver 22 of FIG. 20 is not loaded, that is, none of the three loops 23, 24, and 25 are connected to a load, the wireless power receiver 22 forms a 3D omni-directional wireless power relay receiver. FIG. 21 shows an example of a 3D wireless power transfer system comprising one 3D omni-directional wireless power transmitter 1, three 3D omni-directional relay receivers 28, 29, and 30, and two 3D omni-directional loaded receivers 26 and 27. If necessary, more than one 3D omni-directional wireless power transmitter 1 can be used in a wireless power transfer system in accordance with embodiments of the present invention.

In principle, the wireless power receivers 16 with focusing loops 19, such as those shown in FIG. 18 and FIG. 19, can also be used in association with the 3D omni-directional wireless power transmitters 1 and the 3D wireless power receivers 22, especially if they are acting as relay receivers, if the receiving sides 18 of the wireless power receivers 16 face the transmitters 1 and/or the 3D wireless power receivers 22.

Wireless Power Receivers Inside Wireless Power Transmitters

It has been pointed out that the wireless power receivers 8 can be placed around the 2D or 3D omni-directional wireless power transmitters 1 to pick up power wirelessly. It should be noted that wireless power receivers 8 can also be located inside the loop structures of the wireless power transmitters 1. FIG. 22 and FIG. 23 show the use of a single coil wireless power receiver inside the 2D and 3D omni-directional wireless power transmitter 1, respectively.

RFIDs are one example of how this can be applied. Many RFID tags consisting of rechargeable batteries with wireless power receivers can be placed inside a container with a shape that can be enclosed by the loops of the 2D or 3D omni-directional wireless power transmitters 1. In this way, many RFID tags can be placed inside the container and charged simultaneously.

More than Three Loops

The present description has concentrated mainly on the omni-directional wireless power transmitter 1 with the basic three coils arranged in an orthogonal manner in the x-, y- and z-planes. However, the present invention also provides wireless power transmitters with more than three coils. These additional coils can be located between the three orthogonal coils if desired.

Contrast Between CCC and ICC

Figure 24:
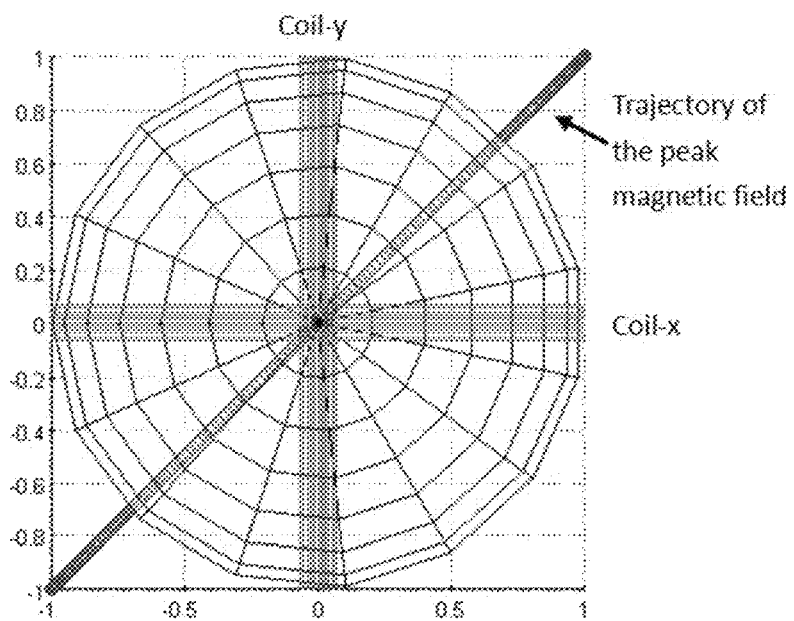
FIG. 24 is a graph showing the trajectory of the peak magnetic field vector generated by a wireless power transmitter with two orthogonal coils in accordance with an embodiment of the present invention, where the currents supplied to the two orthogonal coils have the same magnitude and no phase shift.
Figure 25:
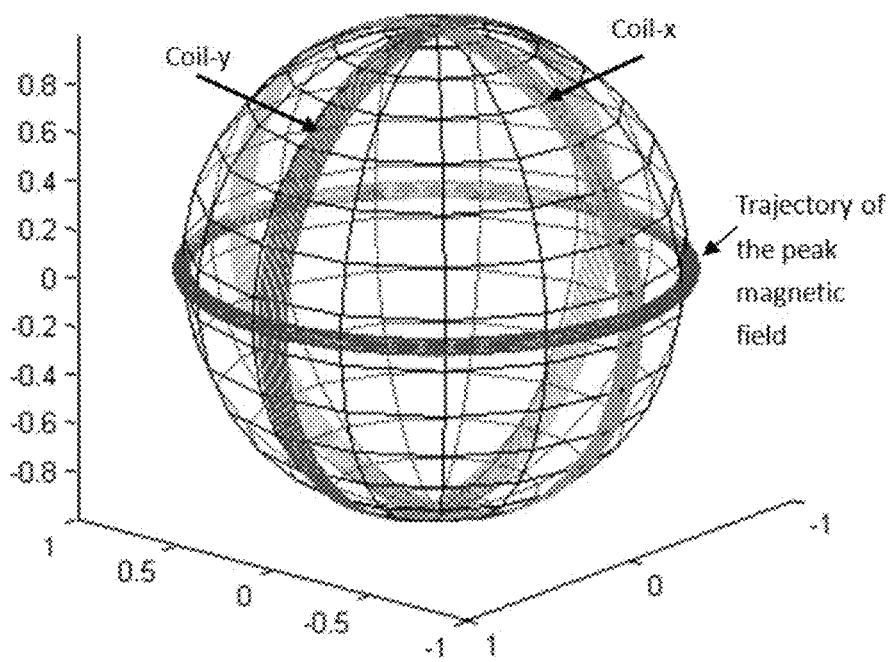
FIG. 25 is a graph showing the trajectory of the peak magnetic field vector generated by a wireless power transmitter with two orthogonal coils in accordance with an embodiment of the present invention, where the currents supplied to the two orthogonal coils have the same magnitude but have a phase shift of 90°.
Figure 26A:
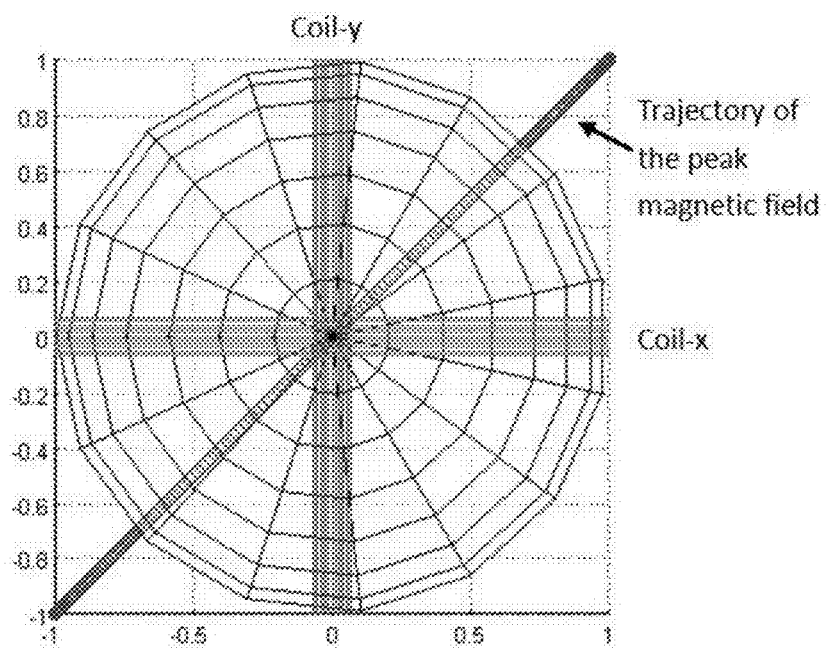
FIGS. 26(a) to (d) are graphs showing the trajectory of the peak magnetic field vector generated by a wireless power transmitter with three orthogonal coils in accordance with an embodiment of the present invention, where the currents supplied to the three orthogonal coils have the same magnitude and no phase shift.
Figure 26B:
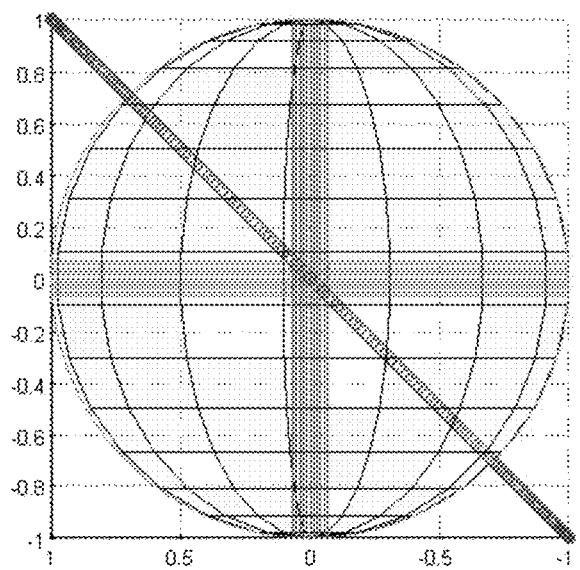
Figure 26C:
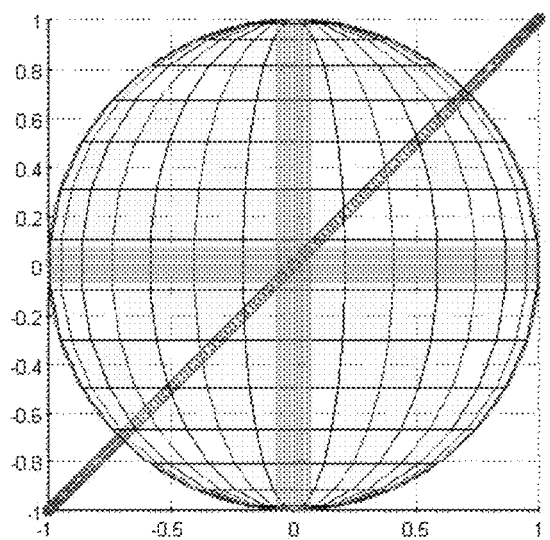
Figure 26D:
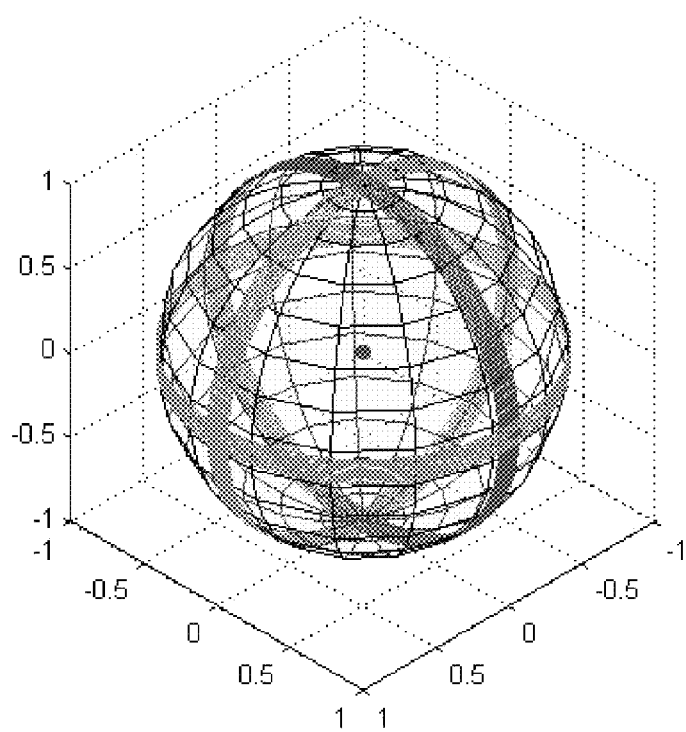
Figure 27A:
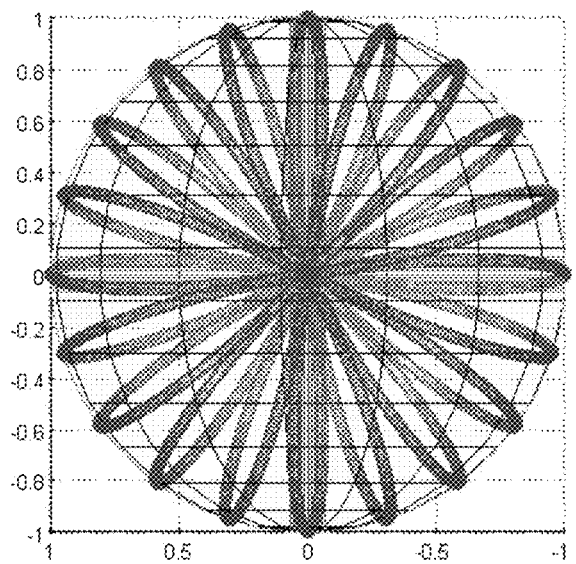
FIGS. 27(a) to (d) are graphs showing the trajectory of the peak magnetic field vector generated by a wireless power transmitter with three orthogonal coils under current amplitude modulation control in accordance with an embodiment of the present invention.
Figure 27B:
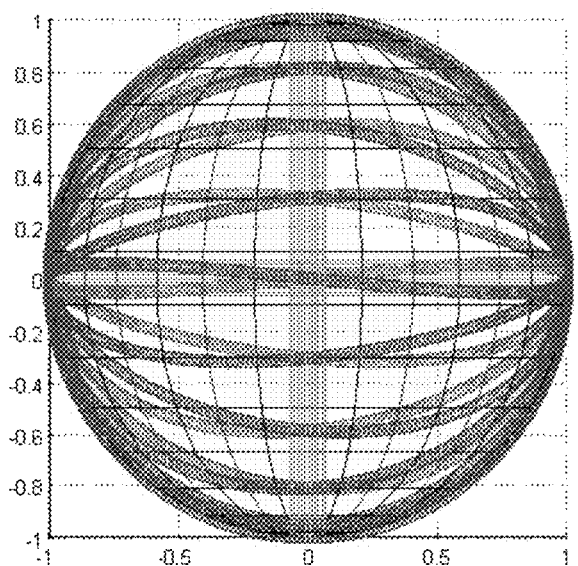
Figure 27C:
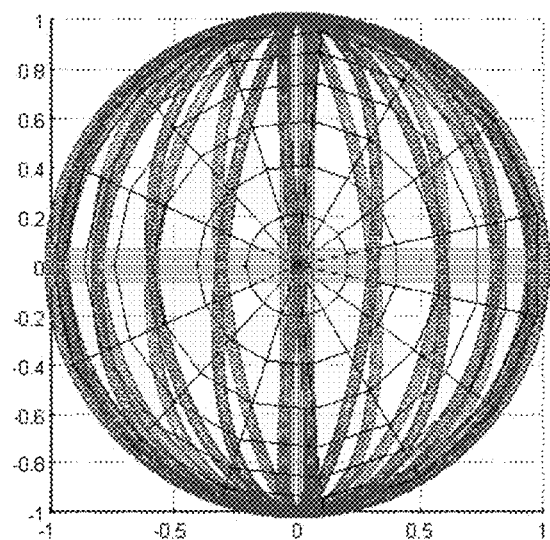
Figure 27D:
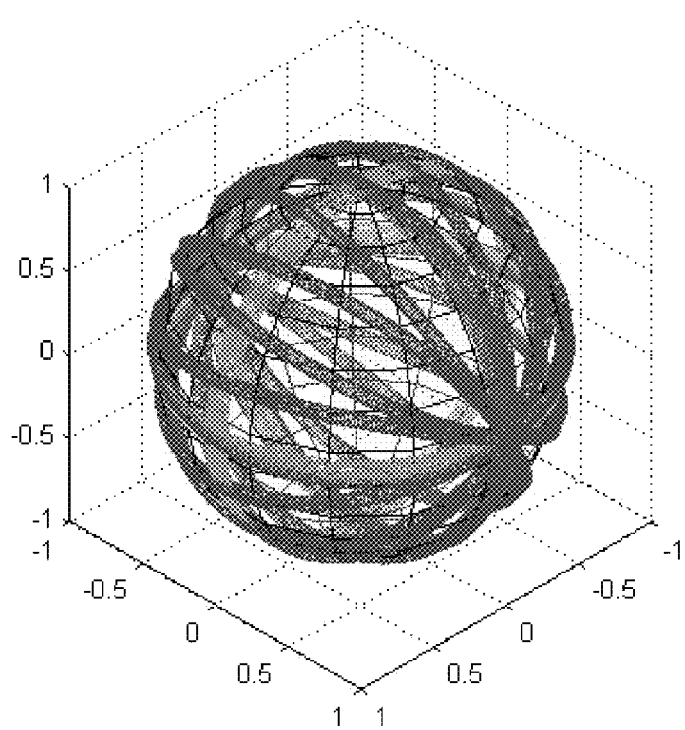

For a 2D wireless power transmitter 1, if the same current without phase shift is fed to two orthogonal loops Coil-x and Coil-y, such as loops 2 and 3 described above, under the ICC method, the trajectory of the arrowhead of the peak magnetic field vector points along the 45° between the planes of Coil-x and Coil-y. If viewed from the z-axis, the trajectory will be viewed as a straight line as shown in FIG. 24. However, by simply including a phase shift of 90° between the currents in Coil-x and Coil-y, the CCC method of embodiments of the present invention will generate the trajectory shown in FIG. 25. If viewed from the z-axis, the trajectory will look like a circle.

Similarly for a 3D wireless power transmitter 1, the ICC approach will generate a trajectory depicted in the different views shown in FIG. 26($a$) to FIG. 26($d$). It can be seen that this trajectory does not form or approximate a sphere. However, the trajectory generated by the CCC approach of embodiments of the present invention is displayed in FIG. 27($a$) to FIG. 27($d$). It is clear that the trajectory forms or approximates a sphere, which confirms the omni-directional nature of the wireless power transfer.

As described above, the present invention concerns new methods for omni-directional wireless power transfer via magneto-inductive coupling of transmitter and receiver modules. Novel 3-dimensional (3D) omni-directional wireless power transmitter, relay resonator and receiver structures consisting of three orthogonal coils (with one coil in each of the orthogonal X-, Y- and Z-planes) have been described. The coils can be of circular, square, rectangular, or any polygonal cross-section. The methods provided by the present invention allow omni-directional power transmitters to transmit energy in any arbitrary direction. Through the current magnitude control or amplitude modulation, and/or phase angle control or frequency modulation of the current excitation in the three coils, the wireless power can be controlled in either an omni-directional mode or controlled-directional mode. If needed, the current magnitude control and phase angle control schemes can be used together. The 3D omni-directional wireless power concept can be reduced to a 2D embodiment.

The present invention provides novel current control methods that are based on the MEE method instead of the MPT method as described in References 12 and 13 listed below. These control methods lead to genuine omni-directional wireless power transfer based on 3D transmitter and 2D transmitter structures using orthogonal coils or coil-resonators. In addition, the present invention applies not only to 3D receivers based on 3 orthogonal coils (as required in the technique reported in Reference 13 listed below). A "coil resonator" here refers to the use of a series capacitor in the coil, whereby the coil inductance and series capacitor form a resonator. A comparison of this invention and methods of References 12 and 13 listed below is listed in Table 1 below.

TABLE 1

Comparison of the present invention with two recent methods.

| | Present invention | Reference 12 | Reference 13 |
|---|---|---|---|
| Method | Maximum energy efficiency (MEE) | Maximum power transfer (MPT) | Maximum power transfer (MPT) |
| Impedance matching of source and system | Not needed | Needed | Needed |
| Maximum overall system efficiency limitation at 50% | No | Yes | Yes |
| Receiver structures | Applicable to Single-coil, 2-coil, 3-coil receiver structures | Applicable to single-coil receivers | Applicable to 3-coil receiver structures. |
| Receiver locations successfully tested | Inside and outsider the Transmitter Structure | Outside the Transmitter structure | Inside the transmitter structure |
| Coil resonator structure | Closed coil structure with coil inductance in series with a capacitor | Open coil structure with coil inductance with parasitic capacitance | Open coil structure with coil inductance with parasitic capacitance |
| Operating frequency | 10 s of kilo-hertz upwards | Over 10 mega-hertz | Over 10 mega-hertz |
| Coil connection | Connected to 3 drivers with different control | | |
| Current control methods | Different currents for all transmitter coils based on phase angle control, frequency modulation (FM) and/or amplitude modulation (AM) | Same current for all transmitter coils | Same current for all transmitter coils |

Wireless power transfer is emerging as an attractive technology in the consumer electronics sector and it has the capability to eliminate the need for cables and cords for charging and powering of varied consumer electronic devices. Applications of the present invention include charging multiple RFID tags, LED lighting products/gadgets, and mobile devices placed in any orientation.

Other applications include electric vehicles (EVs). The present invention supports wireless power transfer in a specific direction with high efficiency. Therefore, the present invention is particularly suited for charging EVs. One preferred arrangement is the use of the 2D wireless power receiver 16. For example, one or more of these 2D wireless power receivers 16 can be arranged in the floor of an EV with their receiving sides 18 facing down towards the ground. Embedded in the ground are one or more wireless power transmitters so that when the EV is positioned above the wireless power transmitters, wireless power is transmitted from the wireless power transmitters to the 2D wireless power receivers 16. Thus, the present invention solves problems including the problem of misalignment of the EV and the wireless power transmitters since the focusing loops 19 of the 2D wireless power receivers focus the wireless power towards the receiving loop 17 even when the 2D wireless power receivers are not precisely aligned with the wireless power transmitters. In other embodiments, the direction of wireless power transfer can be controlled to improve the effectiveness of the wireless power transfer and to further overcome any misalignment problems.

Robotics is another application. The present invention enables wireless power transfer in robotic components to avoid damaging or breaking cables and cords caused by mechanical movement. Also, a robotic arm can move in multiple directions. Prior art wireless power transfer approaches can only transfer power in a limited range of angles, and therefore, the robotic arm may stop moving if power is not received constantly. With the present invention, on the other hand, the robotic arm constantly receives power no matter how it moves since the present invention can deliver wireless power omni-directionally.

The present invention is also particularly useful for lighting devices. Transmitting power wirelessly avoids the need to run wiring or cables in for example ceilings or ceiling spaces, or where wiring or cables would pose safety hazards.

The present invention transfers power wirelessly and effectively to a variety devices (e.g. mobile phones, RFID tags, sensors, lighting devices) in all directions. In doing so, it solves the problem of misalignment caused by, for example, scattered portable devices or moving vehicles or components.

Although the present invention has been described with reference to specific examples, it will be appreciated by those skilled in the art that the invention can be embodied in many other forms. It will also be appreciated by those skilled in the art that the features of the various examples described can be combined in other combinations.

REFERENCES

1. J. C. Schuder, H. E. Stephenson, and J. F. Townsend, "High level electromagnetic energy transfer through a closed chestwall," *IRE Int. Conv. Rec.*, pt. 9, vol. 9, pp. 119-126, 1961.
2. W. H. Ko, S. P. Liang, and C. D. F. Fung, "Design of rf-powered coils for implant instruments," *Med. Biol. Eng. Comput.*, vol. 15, pp. 634-640, 1977.
3. E. Hochmair, "System optimization for improved accuracy in transcutaneous signal and power transmission", *IEEE Trans. Biomedical Engineering*, vol. BME-31, no. 2, pp. 177-186, February 1984.
4. Y. Jang and M. M. Jovanovic, "A contactless electrical energy transmission system for portable-telephone battery chargers", *IEEE Trans. Industrial Electronics*, vol. 50, no. 3, pp. 520-527, June 2003.
5. A. Kurs, A. Karalis, R. Moffatt, J. D. Joannopoulos, P. Fisher, and M. Soljacic, "Wireless power transfer via strongly coupled magnetic resonances," *Science*, vol. 317, no. 5834, pp. 83-86, July 2007.
6. M. Kiani, and M. Ghovanloo, "The circuit theory behind coupled-mode magnetic resonance-based wireless power transmission," *IEEE Trans. Circuits Systems—I*, vol. 59, no. 8, pp. 1-10, August 2012.
7. F. Zhang, S. A. Hackworth, W. Fu, C. Li, Z. Mao, and M. Sun, "Relay effect of wireless power transfer using strongly coupled magnetic resonances," *IEEE Transactions on Magnetics*, vol. 47, no. 5, pp. 1478-1481, May 2011.
8. J. W. Kim, N. C. Son, K. H. Kim and Y. J. Park, "Efficiency analysis of magnetic resonance wireless power transfer with intermediate resonant coil", *IEEE Antennas and Wireless Propagation Letters*, vol. 10, pp. 389-392, 2011.
9. W. X. Zhong, C. K. Lee and S. Y. R. Hui, "Wireless Power Domino-Resonator Systems with Non-coaxial axes and Circular Structures", *IEEE Trans. Power Electronics*, vol. 27, no. 11, pp. 4750-4762, November 2012.
10. W. X. Zhong, C. K. Lee and S. Y. R. Hui, "General Analysis on the Use of Tesla's Resonators in Domino Forms for Wireless Power Transfer", *IEEE Trans. Industrial Electronics*, vol. 60, no. 1, pp. 261-270, January 2013.
11. Hui S. Y. R., Zhong W. X. and Lee C. K., "A critical review on recent progress of mid-range wireless power transfer", *IEEE Transactions on Power Electronics* (early access, 2013).
12. D. Wang, Y. Zhu, Z. Zhu, T. T. Mo and Q. Huang, "Enabling multi-angle wireless power transmission via magnetic resonant coupling", *International Conference on Computing and Convergence Technology (ICCCT)* 2012, pp: 1395-1400.
13. O. Jonah, S. V. Georgakopoulos and M. M. Tentzeris, "Orienation insensitive power transfer by magnetic resonance for mobile devices", *IEEE Wireless Power Transfer*, Perugia, Italy, 15-16 May 2013, pp: 5-8.

The invention claimed is:

1. A wireless power transmitter comprising:
  at least two loops;
  separate drivers, each driving a respective one of the loops and providing a respective alternating current to the respective loop, thereby to transmit wireless power for receipt by at least one wireless power receiver; and
  a controller for coordinated current control of the drivers such that a magnetic field vector is generated by the respective alternating currents and is controllable to point in one or more of any direction in two-dimensional or three-dimensional space thereby transmitting wireless power in one or more predetermined directions in two-dimensional or three-dimensional space.

2. A wireless power transmitter according to claim 1 wherein the respective alternating currents provided by the drivers differ in one or more of phase angle, frequency, and amplitude.

3. A wireless power transmitter according to claim 1 comprising a capacitor connected in series with each loop.

4. A wireless power transmitter according to claim 1 wherein the wireless power transmitter is powered by an AC power source.

5. A wireless power transmitter according to claim 1 wherein the wireless power transmitter is powered by a DC power source providing DC power, and each driver comprises a power inverter to convert the DC power into AC power.

6. A wireless power transmitter according to claim 1 wherein the wireless power transmitter is powered by a DC power source providing DC power, and each driver comprises an inverter leg of a power inverter to convert the DC power into AC power.

7. A wireless power transmitter according to claim 1 wherein the respective alternating currents provided by the drivers are high frequency alternating currents.

8. A wireless power transmitter according to claim 1 comprising three of the loops.

9. A wireless power transmitter according to claim 1 wherein each loop defines a respective loop plane, the loops being arranged such that the loop planes are orthogonal to each other.

10. A wireless power transmitter according to claim 1 wherein the drivers only drive a subset of the loops.

11. A wireless power transmitter according to claim 1 wherein two loops are driven to transmit wireless power in all directions in one plane.

12. A wireless power transmitter according to claim 1 wherein three loops are driven to transmit wireless power in all directions in three-dimensional space.

13. A wireless power transmitter according to claim 1 wherein the loops define an interior space for receiving one or more wireless power receivers such that wireless power can be transmitted from the wireless power transmitter for receipt by the wireless power receivers.

14. A wireless power transmitter according to claim 1 wherein the loops surround a receptacle for receiving one or more wireless power receivers such that wireless power can be transmitted from the wireless power transmitter for receipt by the wireless power receivers.

15. A wireless power transmitter according to claim 1 wherein each loop is any one of circular, triangular, rectangular, and polygonal in cross-section.

16. A wireless power receiver comprising:
  a receiver loop wound around a receiver loop axis and defining a receiver loop plane, the receiver loop plane having a receiving side for receiving wireless power;
  at least two focusing loops, each focusing loop defining a respective focusing loop plane, the focusing loops arranged on the receiving side adjacent the loop axis and uniformly around the loop axis with the focusing loop planes tilted towards the receiver loop plane.

17. A wireless power receiver according to claim 16 wherein the focusing loop planes are tilted towards the receiver loop plane such that each focusing loop plane forms an angle from 45° to 60° with the receiver loop axis.

18. A wireless power receiver according to claim 16 wherein the receiver loop is connected to a load, thereby allowing wireless power received by the wireless power receiver to be delivered to the load.

19. A wireless power transmission system comprising:
a wireless power transmitter comprising:
at least two loops;
separate drivers, each driving a respective one of the loops and providing a respective alternating current to the respective loop, thereby to transmit wireless power for receipt by at least one wireless power receiver; and
a controller for coordinated current control of the drivers such that a magnetic field vector is generated by the respective alternating currents and is controllable to point in one or more of any direction in two-dimensional or three-dimensional space thereby transmitting wireless power in one or more predetermined directions in two-dimensional or three-dimensional space; and
the at least one wireless power receiver comprising:
a receiver loop wound around a receiver loop axis and defining a receiver loop plane, the receiver loop plane having a receiving side for receiving wireless power;
at least two focusing loops, each focusing loop defining a respective focusing loop plane, the focusing loops arranged on the receiving side adjacent the loop axis and uniformly around the loop axis with the focusing loop planes tilted towards the receiver loop plane.

* * * * *